(12) United States Patent
Malik et al.

(10) Patent No.: US 10,749,248 B1
(45) Date of Patent: Aug. 18, 2020

(54) ANTENNA MODULE PLACEMENT AND HOUSING FOR REDUCED POWER DENSITY EXPOSURE

(71) Applicant: QUALCOMM Incorporated, San Diego, CA (US)

(72) Inventors: Rahul Malik, San Diego, CA (US); Mohammad Ali Tassoudji, San Diego, CA (US); Jatupum Jenwatanavet, Singapore (SG); Jong Hyeon Park, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/579,522

(22) Filed: Sep. 23, 2019

(51) Int. Cl.
*H04W 88/02* (2009.01)
*H01Q 1/24* (2006.01)
*H01Q 21/06* (2006.01)
*H04B 7/0408* (2017.01)
*H04B 7/06* (2006.01)
*H04W 52/18* (2009.01)

(52) U.S. Cl.
CPC ........... *H01Q 1/245* (2013.01); *H01Q 21/061* (2013.01); *H04B 7/0408* (2013.01); *H04B 7/0695* (2013.01); *H04W 52/18* (2013.01); *H04W 88/02* (2013.01)

(58) Field of Classification Search
CPC .... H01Q 1/245; H01Q 21/061; H04B 7/0408; H04B 7/0695; H04W 52/18; H04W 88/02
USPC ........................................................ 455/522
See application file for complete search history.

(56) References Cited

U.S. PATENT DOCUMENTS

| | | | | |
|---|---|---|---|---|
| 5,548,420 | A * | 8/1996 | Koshimizu | G02F 1/132 349/168 |
| 6,392,603 | B1 * | 5/2002 | Kurz | H01Q 1/526 343/702 |
| 6,492,957 | B2 * | 12/2002 | Carillo, Jr. | H01Q 1/245 250/336.1 |
| 6,897,826 | B1 * | 5/2005 | Kunz | H01Q 1/245 343/702 |
| 8,974,443 | B2 * | 3/2015 | Dunleavy | G06Q 20/145 606/2 |
| 9,947,195 | B2 * | 4/2018 | Fukuda | G06K 7/10445 |
| 10,116,143 | B1 * | 10/2018 | Leabman | H01Q 21/061 |
| 10,256,552 | B2 * | 4/2019 | Jan | H01Q 1/246 |

(Continued)

FOREIGN PATENT DOCUMENTS

WO  WO-2018119153 A2  6/2018

*Primary Examiner* — Hai V Nguyen
(74) *Attorney, Agent, or Firm* — Holland & Hart LLP

(57) ABSTRACT

Methods, systems, and devices for wireless communications are described. In some systems, a user equipment (UE) may use transmissions causing power density exposure (PDE) to nearby users. To reduce the PDE of an antenna module (e.g., below a maximum PDE threshold), the UE may implement a shielding strip around the antenna module. For example, the antenna module may include a substrate having a first surface and a set of antenna elements on the first surface. The shielding strip may enclose the set of antenna elements of the antenna module and extend away from the first surface above the antenna elements. The shielding strip may reduce PDE outside a field of view of the antenna module. Additionally, in some cases, the placement of the antenna module in the UE and the materials used for constructing the UE may further reduce PDE.

30 Claims, 9 Drawing Sheets

(56) References Cited

U.S. PATENT DOCUMENTS

| | | | |
|---|---|---|---|
| 10,267,837 B2* | 4/2019 | Bassen | G01R 29/0814 |
| 10,292,263 B2* | 5/2019 | Rogers | H05K 1/0286 |
| 10,381,880 B2* | 8/2019 | Leabman | H02J 7/025 |
| 10,566,298 B2* | 2/2020 | Dalmia | H01L 23/3157 |
| 2002/0057224 A1* | 5/2002 | Shinichi | H01Q 1/243 |
| | | | 343/702 |
| 2002/0058483 A1* | 5/2002 | Shinichi | H01Q 1/243 |
| | | | 455/575.7 |
| 2002/0075189 A1* | 6/2002 | Carillo, Jr. | H01Q 1/245 |
| | | | 343/702 |
| 2006/0055605 A1* | 3/2006 | Peled | H01Q 1/242 |
| | | | 343/702 |
| 2009/0267846 A1* | 10/2009 | Johnson | G01R 29/0857 |
| | | | 343/703 |
| 2012/0073873 A1* | 3/2012 | Nash | H05K 9/0047 |
| | | | 174/382 |
| 2012/0087065 A1* | 4/2012 | Kim | G06F 1/1656 |
| | | | 361/679.01 |
| 2015/0055009 A1* | 2/2015 | Choi | H04N 5/2257 |
| | | | 348/335 |
| 2016/0020647 A1* | 1/2016 | Leabman | H02J 50/20 |
| | | | 307/104 |
| 2016/0113108 A1* | 4/2016 | Sundaram | H05K 1/0218 |
| | | | 174/350 |
| 2016/0292977 A1* | 10/2016 | Fukuda | G06K 7/10445 |
| 2017/0077588 A1* | 3/2017 | Fukuda | H01Q 1/2216 |
| 2017/0085289 A1* | 3/2017 | Jan | H01Q 21/28 |
| 2019/0011487 A1 | 1/2019 | Bassen et al. | |
| 2019/0035749 A1 | 1/2019 | Dalmia et al. | |
| 2019/0051989 A1* | 2/2019 | Kim | H01L 24/20 |
| 2019/0103653 A1 | 4/2019 | Jeong et al. | |
| 2019/0159155 A1* | 5/2019 | Abedini | H04W 72/0406 |
| 2019/0159156 A1* | 5/2019 | Abedini | H04L 5/0048 |
| 2019/0319348 A1* | 10/2019 | Sato | H01Q 9/42 |
| 2019/0334387 A1* | 10/2019 | Swan | H02J 50/90 |
| 2020/0006988 A1* | 1/2020 | Leabman | H02J 50/80 |
| 2020/0029345 A1* | 1/2020 | Malik | H04L 27/364 |

\* cited by examiner

US 10,749,248 B1

ANTENNA MODULE PLACEMENT AND HOUSING FOR REDUCED POWER DENSITY EXPOSURE

FIELD OF TECHNOLOGY

The present disclosure relates generally to wireless communications and more specifically to antenna module placement and housing for reduced power density exposure (PDE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may use millimeter wave (mmW) transmissions for wireless communications. For example, an NR system may use time division duplexed (TDD) mmW for both uplink and downlink transmissions (e.g., within the same frequency band). Regulatory bodies may impose limits on an amount of mmW power density exposure (PDE) that humans (e.g., users) can experience using mmW devices. For example, regulatory bodies, such as the United States Federal Communications Commission (FCC), may specify that exposure to a user should be less than a given amount of power per unit area when averaged over a given area and time period. The requirements to limit PDE to users may result in difficulties maintaining radio coverage while minimizing power consumption, and may result in lower communication quality.

SUMMARY

The described techniques relate to improved methods, systems, devices, and apparatuses that support antenna module placement and housing for reduced power density exposure (PDE). Generally, the described techniques provide for maintaining a power density (PD) level during transmissions to conform the UE to a maximum PDE threshold using a shielding strip for an antenna module. In some wireless communications systems, a user equipment (UE) may create transmissions (e.g., millimeter wave (mmW) transmissions) that result in PDE to a user of the UE or other nearby users. To reduce the PDE for an antenna module (e.g., below the maximum PDE threshold), the UE may implement a shielding strip around the antenna module. For example, the antenna module may include a substrate and a set of antenna elements on a first surface of the substrate. The shielding strip may enclose (e.g., form a continuous loop around) the set of antenna elements (e.g., all elements of the module) and extend away from the radiating surface above the first surface. This shielding strip may be a component of the antenna module or may be built into or attached to the housing of the UE. The shielding strip may be grounded or floating and may reduce PDE outside a field of view of the antenna module. Additionally, in some cases, the placement of the antenna module in the UE, the materials used for constructing the UE, or both may further reduce the PDE due to the antenna module.

An antenna module is described. The antenna module may be an example of an apparatus. The antenna module may include a substrate having a first surface, a set of antenna elements on the first surface, and a shielding strip enclosing the set of antenna elements and extending away from the first surface of the substrate, where an upper edge of the shielding strip is above the set of antenna elements. The shielding strip may reduce PDE (e.g., outside the field of view of a sensor or the antenna module).

In some examples of the antenna module described herein, a lower edge of the shielding strip may be at or above the first surface of the substrate.

In some examples of the antenna module described herein, the substrate includes a printed circuit board (PCB), the set of antenna elements may be on the PCB, and the shielding strip may be external to the PCB.

In some examples of the antenna module described herein, the PCB further may include a plating member enclosing each antenna element of the set of antenna elements, where the plating member may be on the PCB. These plating members may be examples of individual wells etched into the PCB for each antenna element and may provide some shielding and/or isolation for the antenna elements. The shielding strip may provide significant, additional PDE shielding for the entire antenna module.

In some examples of the antenna module described herein, the shielding strip may be at or above a perimeter of the PCB. Positioning the shielding strip at the perimeter of the PCB may optimize the shielding for a given shielding strip height without modifying the PCB.

In some examples of the antenna module described herein, the upper edge of the shielding strip may be configured to be flush with a housing of a UE. This may optimize a height of the shielding strip without reducing the usability and form design of the UE housing.

In some examples of the antenna module described herein, a height of the shielding strip from the first surface of the substrate may be based on a predetermined PDE threshold, or a field of view for the set of antenna elements, or a field of view for a sensor, or a combination thereof. Such a design may improve PDE shielding where PDE detection is not supported.

In some examples of the antenna module described herein, the shielding strip may be electrically coupled to a ground plane of the antenna module.

In some other examples of the antenna module described herein, the shielding strip may be electrically isolated from a ground plane of the antenna module.

In some examples of the antenna module described herein, one or more electrical components may be mounted on a second surface of the substrate opposite the first surface of the substrate.

In some examples of the antenna module described herein, the set of antenna elements includes at least a set of patch antennas, or a set of slot antennas, or a set of dipole antennas, or a combination thereof forming an antenna array.

A UE is described. The UE may be an example of an apparatus. The UE may include a housing having an exterior surface, an antenna module mounted within the housing, where the antenna module includes a set of antenna elements on a first surface of a substrate, and a shielding strip enclosing the set of antenna elements and extending away from the first surface of the substrate, where an upper edge of the shielding strip is above the set of antenna elements. The shielding strip may reduce PDE (e.g., outside the field of view of a sensor or the antenna module).

In some examples of the UE described herein, the first surface of the substrate may be recessed from the exterior surface of the housing from a radiating direction of the antenna module. This may allow for the shielding strip to be interior to the UE housing, supporting usability of the UE.

In some examples of the UE described herein, a lower edge of the shielding strip may be at or above the first surface of the substrate.

In some examples of the UE described herein, the antenna module includes the shielding strip, or the housing includes the shielding strip, or the housing includes a part of the shielding strip.

In some examples of the UE described herein, the exterior surface of the housing includes a screen oriented on a first side of the antenna module and a back surface oriented on a second side of the antenna module opposite the screen, the back surface including a first conductive surface.

In some examples of the UE described herein, the UE includes a second conductive surface oriented on the first side of the antenna module opposite the back surface, where the screen includes the second conductive surface or the second conductive surface may be mounted to a back of the screen. This second conductive surface may match (or replicate) properties of the first conductive surface, such that the PDE is symmetrical (or nearly symmetrical) between the front and back surfaces of the UE. Semi-symmetrical PDE may support optimal shielding, as one face of the UE does not experience significantly more PDE than the other face.

In some examples of the UE described herein, a height of the shielding strip from the first surface of the substrate may be based on a predetermined PDE threshold, or a field of view for the set of antenna elements, or a combination thereof. Such a design may improve PDE shielding where PDE detection is not supported.

In some examples of the UE described herein, the UE may include a sensor to measure PDE, where a height of the shielding strip from the first surface of the substrate may be based on a field of view for the sensor. Such a design may improve PDE shielding where PDE detection is not supported.

In some examples of the UE described herein, the shielding strip may be electrically coupled to a ground plane of the antenna module.

In some other examples of the UE described herein, the shielding strip may be electrically isolated from a ground plane of the antenna module.

In some examples of the UE described herein, the set of antenna elements includes a set of patch antennas forming an antenna array.

In some examples of the UE described herein, the upper edge of the shielding strip may be at or below the exterior surface of the housing in a radiating direction of the antenna module. This may optimize a height of the shielding strip without reducing the usability and form design of the UE housing.

An apparatus for wireless communications at a UE is described. The apparatus may include a processor, memory coupled with the processor, and instructions stored in the memory. The apparatus may further include an antenna module including a substrate having a first surface and a set of antenna elements on the first surface and a shielding strip enclosing the set of antenna elements and extending away from the first surface. In some examples of the apparatus described herein, the apparatus may additionally include a detector. In some examples of the apparatus described herein, the apparatus may additionally include a second antenna module including a second substrate having a second surface and a second set of antenna elements on the second surface and a second shielding strip enclosing the second set of antenna elements and extending away from the second surface.

A method for wireless communications at a UE is described. The method may include determining a transmit power for a communication beam of the UE based on a PDE threshold for the communication beam and a shielding strip enclosing a set of antenna elements on a first surface of an antenna module of the UE, the shielding strip enclosing the set of antenna elements above the first surface and transmitting, using the communication beam and according to the determined transmit power, an uplink signal using the antenna module.

An apparatus for wireless communications at a UE is described. The apparatus may include a processor, memory coupled with the processor, and instructions stored in the memory. The instructions may be executable by the processor to cause the apparatus to determine a transmit power for a communication beam of the UE based on a PDE threshold for the communication beam and a shielding strip enclosing a set of antenna elements on a first surface of an antenna module of the UE, the shielding strip enclosing the set of antenna elements above the first surface and transmit, using the communication beam and according to the determined transmit power, an uplink signal using the antenna module.

Another apparatus for wireless communications at a UE is described. The apparatus may include means for determining a transmit power for a communication beam of the UE based on a PDE threshold for the communication beam and a shielding strip enclosing a set of antenna elements on a first surface of an antenna module of the UE, the shielding strip enclosing the set of antenna elements above the first surface and transmitting, using the communication beam and according to the determined transmit power, an uplink signal using the antenna module.

A non-transitory computer-readable medium storing code for wireless communications at a UE is described. The code may include instructions executable by a processor to determine a transmit power for a communication beam of the UE based on a PDE threshold for the communication beam and a shielding strip enclosing a set of antenna elements on a first surface of an antenna module of the UE, the shielding strip enclosing the set of antenna elements above the first surface and transmit, using the communication beam and according to the determined transmit power, an uplink signal using the antenna module.

Some examples of the method, apparatuses, and non-transitory computer-readable medium described herein may further include operations, features, means, or instructions for determining a second transmit power for a second communication beam of the UE based on a second PDE threshold for the second communication beam and the second shielding strip enclosing the second plurality of antenna elements and transmitting a second uplink signal using the second antenna module and the second communication beam based on the determined second transmit power. Such examples of the method, apparatuses, and non-transitory computer-readable medium described herein may support optimized PDE shielding for multiple antenna arrays with different configurations for a same UE.

Some examples of the method, apparatuses, and non-transitory computer-readable medium described herein may further include operations, features, means, or instructions for identifying a maximum transmit power for the communication beam based on the PDE threshold for the communication beam and the shielding strip enclosing the set of antenna elements, where the transmit power may be determined based on the identified maximum transmit power. Basing the maximum transmit power on the properties of the shielding strip may support an increased maximum transmit power for an antenna array, improving transmission power and/or reliability.

Some examples of the method, apparatuses, and non-transitory computer-readable medium described herein may further include operations, features, means, or instructions for identifying one or more candidate communication beams of the UE, determining a respective PDE characteristic for each of the one or more candidate communication beams, and selecting the communication beam from the one or more candidate communication beams, where the communication beam includes a first PDE characteristic, determining the transmit power for the communication beam may be based on the first PDE characteristic, and selecting the communication beam may be based on at least an uplink grant for the UE, or a power level of the UE, or a projected PDE of the communication beam, or the first PDE characteristic, or a combination thereof. Basing the communication beam selection on the PDE characteristics of the beams due to properties of the shielding strip may support an improved beam selection (e.g., for improved transmission reliability).

Some examples of the method, apparatuses, and non-transitory computer-readable medium described herein may further include operations, features, means, or instructions for detecting a level of PDE of the communication beam, where selecting the communication beam is based on the detected level of PDE. Detecting PDE, in addition to implementing the shielding strip, may further optimize transmit power while supporting specified PDE limits.

In some examples of the method, apparatuses, and non-transitory computer-readable medium described herein, the antenna module includes the shielding strip.

DETAILED DESCRIPTION

Figure 1:
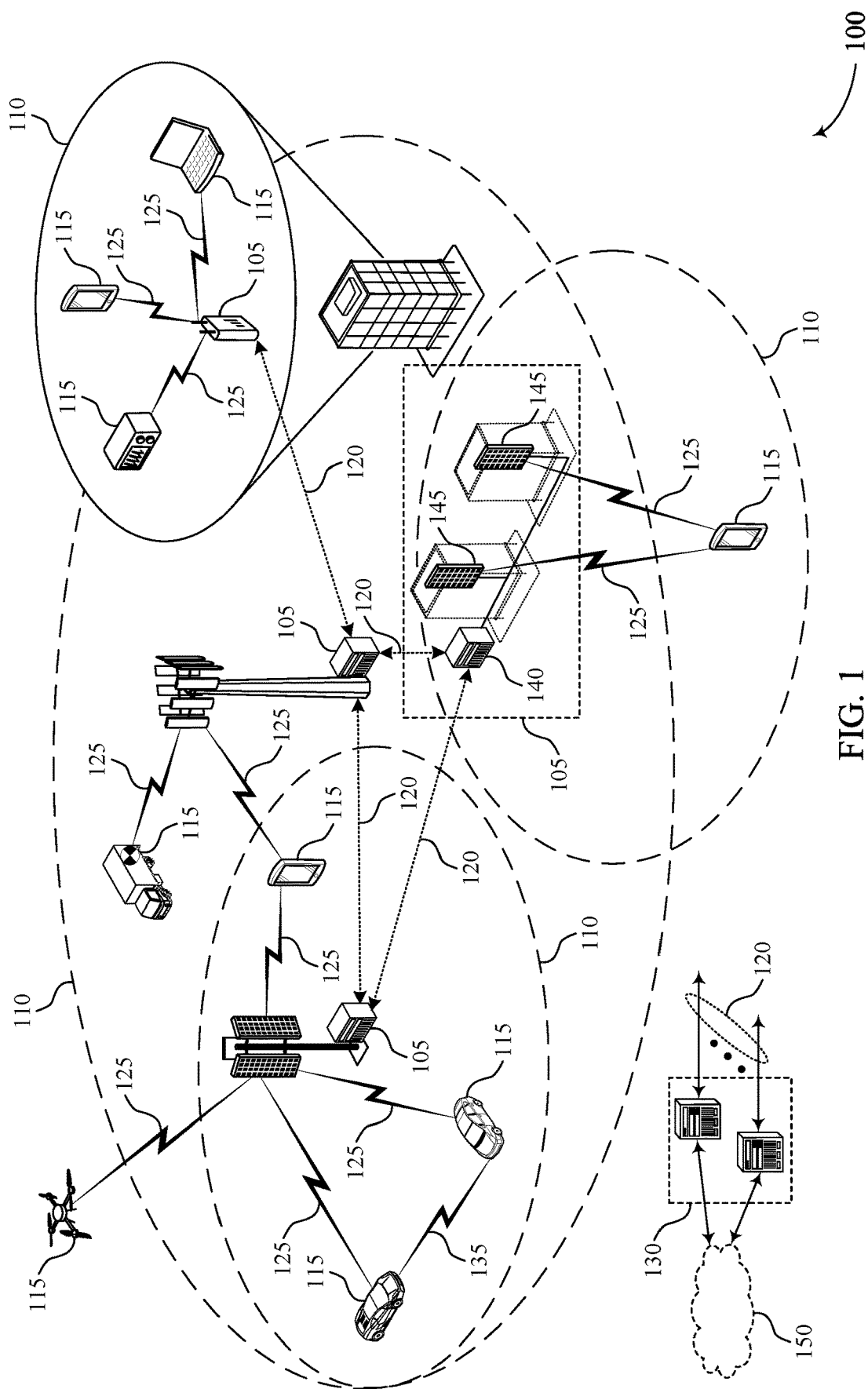
FIG. 1 illustrates an example of a wireless communications system that supports antenna module placement and housing for reduced power density exposure (PDE) in accordance with aspects of the present disclosure.

In some wireless communications systems, a user equipment (UE) may transmit using techniques, such as millimeter wave (mmW) techniques, that cause power density exposure (PDE). The power density (PD) distribution for a UE may be based in part on the form factor (e.g., shape, physical proportions, etc.) of the UE, the materials of the UE, or both. The PDE from a transmitting UE may, in some cases, have harmful effects on a user operating the UE, or nearby the UE. As such, a UE may be implemented to conform to a maximum PDE threshold to limit the PDE experienced by the user.

To maintain a PD level below a maximum PDE threshold (e.g., while maintaining coverage, reducing power consumption, improving communication quality, etc.), an antenna module for mmW transmissions may be housed and located within a UE to reduce PDE to users operating the UE or near the UE. In some cases, this antenna module may operate in a frequency band above 10 gigahertz (GHz). A UE may use a sensor, sensor array, or other sensing mechanism, as part of the antenna module to identify a PD level and control a power output of the antenna based on the PD level. In some cases, depending on the sensing mechanism implemented by the UE, the UE may not accurately determine some areas of PDE. For example, PDE may occur outside of the field of view of the antenna module having the sensing mechanism. Some methods for limiting PDE may not support evaluating PDE outside of the field of view of the antenna module, while other methods may set constant limits on the antenna transmit powers, which may reduce transmission capabilities of wireless devices. Additionally or alternatively, some sensing mechanisms may be unable to measure the PDE on non-radiating faces of the UE, as these sensing mechanisms may be aligned with the radiating face of the UE. To ensure that the maximum PDE threshold is not exceeded in any area due to the mmW transmissions, the module placement and housing may account for the limitations of PD detection and sensing.

In some examples, a UE may include a shielding strip around the radiating elements of an antenna module to reduce PDE. This shielding strip may allow for higher transmit powers while lowering PDE on non-radiating faces of the UE, enabling the UE to meet the PDE threshold, for example by being at or below the maximum PDE. The shielding strip may consist of a three-dimensional (3D) metallic or otherwise conducting structure surrounding the radiating elements of an antenna module (e.g., the antennas forming the antenna array of the antenna module). For example, the shielding strip may form a continuous loop around all of the antenna elements of the antenna module, enclosing the antenna elements when viewed perpendicular to a surface on which the antenna elements are located or attached. For example, the antenna elements may be on a surface of a substrate, where "on" may refer to antenna elements that are formed into, formed on, bonded on, deposited in, deposited on, or otherwise coupled with a surface, where the antenna elements may be above, within (e.g., embedded within), or at the surface. The shielding strip may form a perimeter around the antenna elements on the surface of the substrate.

In some cases, the shielding strip may have a rectangular outline when viewed perpendicular to the plane of the radiating elements. In other cases, the shielding strip may have a different outline, for example a circular or oval outline. The shielding strip may be attached or coupled to a same surface as the radiating elements, may be located above the surface of the radiating elements, or have a height that spans from the surface of the radiating elements to a height above the surface. In some cases, the shielding strip may also extend below the surface of the substrate.

The shielding strip may be designed to reduce near-field exposure while limiting any effects on far-field characteristics of the antenna module. For example, any effects of the shielding strip on the reference signal received power (RSRP) at a receiving device may be mitigated. The shielding strip may be an example of a floating metal cavity (e.g., on a dielectric substrate) or a grounded metal cavity (e.g., connected to a ground plane). Implementing the shielding strip may block significant PDE in non-radiating directions. As such, a UE or antenna module implementing the shielding strip may not use or may reduce the use of sensors in these directions, which may decrease complexity of the UE or antenna module, or improve power efficiency at the UE, or both.

In some examples, the antenna module and shielding strip may be located in a cavity recessed within a face of the UE, such as a side, front, back, bottom, or top face of the UE. This recessed cavity may be designed to accommodate the shielding strip and any interfacing of the shielding strip with a wall of the UE, such that the shielding strip is not exposed on the exterior of the UE. The depth that the antenna module is recessed from the face of the UE may be selected to support a range of transmission angles and may be based on the form factor of the UE. Furthermore, in some cases, the PDE from mmW transmissions may not be symmetric across a device (e.g., despite a symmetric placement of the antenna module). For example, the back face (e.g., at the surface) of the UE may experience more PDE than the front face (e.g., at the surface) of the UE. In some cases, such differences may be based on the different materials used for these surfaces, such as for the UE's screen. To limit the spread of the PD distribution on the back surface of the UE, the antenna module may be housed asymmetrically in the device, or the UE may include additional materials on the back surface to shield against PDE (e.g., similar to or providing similar electrical or other material characteristics as materials used on the front surface).

Aspects of the disclosure are initially described in the context of a wireless communications system. Additional aspects of the disclosure are described with reference to device and antenna module configurations, as well as a process flow. Aspects of the disclosure are further illustrated by and described with reference to apparatus diagrams, system diagrams, and flowcharts that relate to antenna module placement and housing for reduced PDE.

FIG. 1 illustrates an example of a wireless communications system 100 that supports antenna module placement and housing for reduced PDE in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer wavelengths of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, a UE 115 may have one or more antenna arrays that may support various MIMO or beamforming operations. Additionally or alternatively, an antenna panel may support radio frequency beamforming for a signal transmitted via an antenna port. Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A wireless device (e.g., a UE 115) may be configured to limit PDE when transmitting wireless signals (e.g., to a base station 105 or another UE 115). For example, a device may be configured with a PDE limit or threshold that communications from the device may meet (e.g., in order to protect humans or users in the vicinity of the device). The device may be configured with one or more antenna modules oriented in different directions that may radiate wireless signals in one or more directions. In some cases, an antenna module may radiate a signal in one direction, and may account for PDE in the radiating direction, as well as non-radiating directions (e.g., account for PDE on non-radiating surfaces of the device).

The device may include a shielding strip associated with an antenna module, where the shielding strip may include one or more conductive surfaces enclosing antennas within the antenna module. The shielding strip may reduce PDE, reduce manufacturing costs and equipment complexity, and maintain a higher available transmit power. For example, the shielding strip may reduce PDE in non-radiating directions without a need for extra sensors or a reduction in transmit power. A device configured with a shielding strip enclosing antenna elements within its antenna modules may account for shielding introduced by an existence or presence of the shielding strip when configuring signal transmissions. For example, the device may calculate a transmit power of a signal based on a configuration of shielding strip, as well as based on one or more PDE limits, where the transmit power calculations may account for a lower resultant PDE due to the presence of the shielding strip. A shielding strip associated with an antenna module may be configured with various shapes, heights, or cross-sections in order to limit PDE in the device according to the PDE limit or threshold. In some cases, the shielding strip may be included within (e.g., attached to or integrated into) a housing of the device, or on the antenna module.

Figure 2:
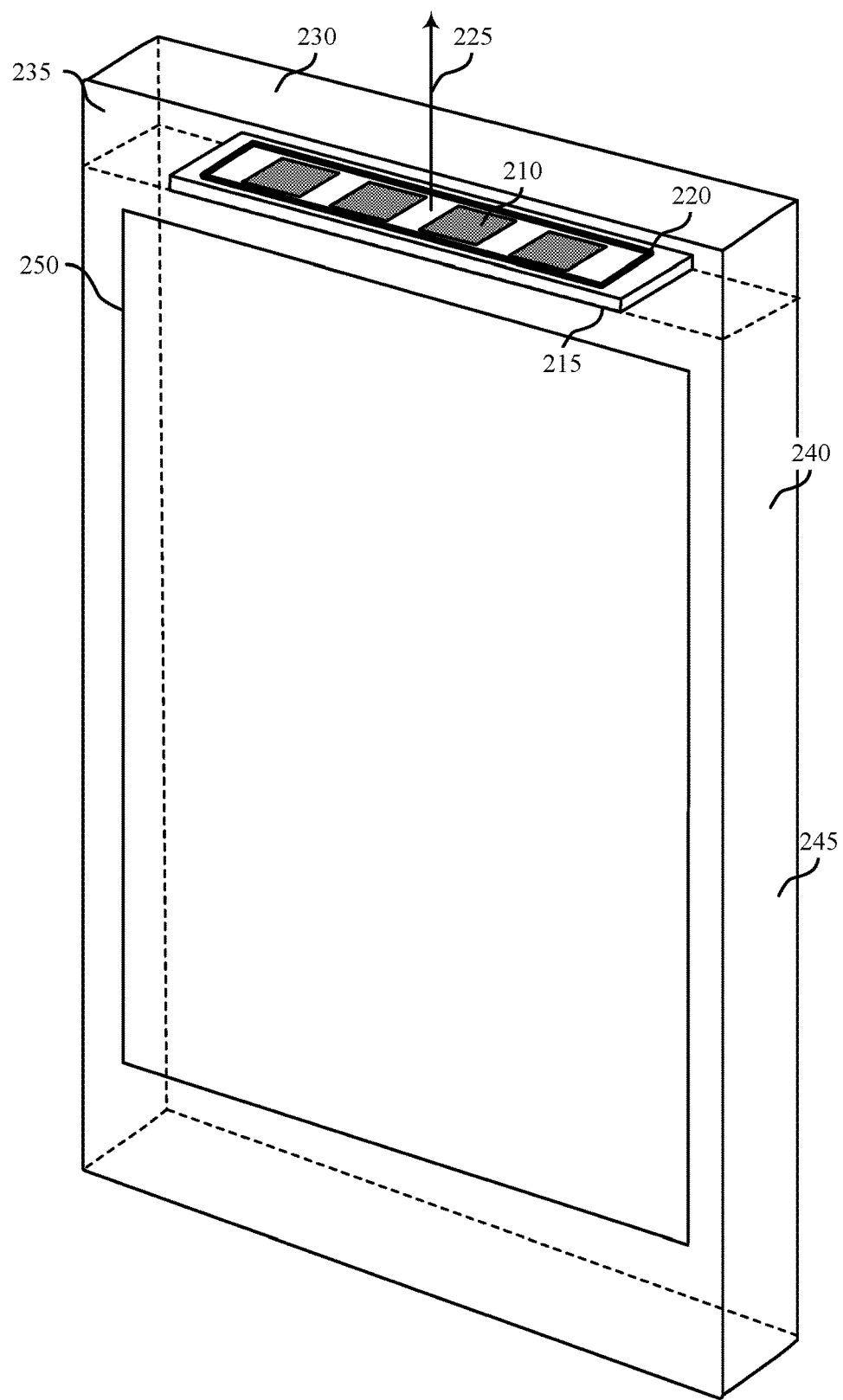
FIG. 2 illustrates an example of a device diagram that supports antenna module placement and housing for reduced PDE in accordance with aspects of the present disclosure.

FIG. 2 illustrates an example of a device 205 that includes an antenna module placement and housing that supports reduced PDE in accordance with aspects of the present disclosure. Device 205 may illustrate example structures, including antenna module structures and housing. In some examples, device 205 may implement aspects of wireless communications system 100 and, in some cases, device 205 may represent a UE 115 described with reference to FIG. 1. As described with reference to FIG. 1, device 205 may send and receive wireless signals using one or more antennas 210 of an antenna module 215 (e.g., mounted to a housing of device 205). Antennas 210 may be formed with, attached to, bonded to, adhered to, or otherwise coupled with or above a substrate or other portion (e.g., a surface) of an antenna module 215. In some cases, the antennas 210 may be coupled with the antenna module 215 and may be above, at, or within a surface of a substrate of the antenna module 215.

For example, device 205 may use one or more antennas 210 to send a mmW signal to a base station 105 (e.g., a base station 105 described with reference to FIG. 1) or to another device (e.g., a UE 115). In some cases, the mmW signal may be beamformed or directionally shaped by the one or more antennas 210 of the antenna module 215. Some antenna modules 215 may be configured to maintain a given quality of coverage and to lower power consumption by using far-field radiation characteristics and/or a placement of the antenna module 215. Far-field radiation characteristics may include a directionality of a signal (e.g., a directional strength or power), a fading factor (e.g., power as a function of distance) of a signal, and the like. In some cases, a radiating face of an antenna module 215 may be placed flush with an exterior surface of the housing of the device 205, while in other cases, the radiating face of the antenna module 215 may be recessed from the exterior surface or face of the housing of the device 205.

Some wireless devices (e.g., device 205) may further be subject to regulations, created by one or more regulatory bodies, regarding an extent of signal power or PDE that is allowed in the vicinity of a human (e.g., a user of device 205). In some cases, a regulation may limit a power per area (e.g., intensity) allowed over a given area of a device housing (e.g., averaged over a given time period). For example, a regulation may state that the PDE of a mmW signal exposed to a user should be less than 1 milliwatt (mW) per square centimeter ($cm^2$) when averaged over an area of four $cm^2$ for four seconds. Additionally or alternatively, some wireless devices (e.g., device 205) may be configured to limit signal power or PDE (e.g., mmW signal power or PDE) in the vicinity of a human (e.g., a user of device 205) regardless of whether any regulations exist regarding signal power exposure. For example, an original equipment manufacturer (OEM) may determine to limit mmW signal intensity (e.g., PDE) allowed over a given area of a device housing (e.g., averaged over a given time period).

Accordingly, some wireless devices may be configured to meet PDE limits (e.g., imposed by regulation or configured by an OEM). In some cases, a wireless device may be configured to limit signal transmission power (e.g., uplink transmission power) such that resulting PDE does not exceed the PDE limits. However, this configuration may limit signaling capabilities (e.g., uplink capabilities) of the device (e.g., based on link budgets and wide area network (WAN) or cellular deployment use cases). For example, if a face of an antenna module 215 is covered by a human hand, an uplink duty cycle may be reduced by 98 percent in order to meet PDE limits.

In some cases, a wireless device may be configured with a sensor to detect the presence of a human (e.g., user) in the vicinity of an antenna module 215 and may adjust transmission properties of one or more antennas 210 if a human is detected. Some examples of adjusting transmission properties may include switching signal transmission to another antenna module 215 of the device, which may reduce the link capabilities of the transmission. Some other examples of adjusting transmission properties may include selectively limiting signal transmission power on one or more antennas 210 of the antenna module 215.

Some devices may include an internal sensor to detect the presence of a human. For example, a device may leverage components of an antenna module 215 to transmit and receive a detection signal and perform detection based on the received signal. The device may additionally or alternatively use a dedicated signal or a mission mode signal (e.g., radar) to detect the presence of a human. Some devices may include an external sensor to detect the presence of a human using device components additional to the antenna module. Examples of external sensors may include light sensors, capacitive sensors, proximity sensors, etc. In some cases, the external sensors may be included in the antenna module 215, while in other cases, the external sensors may be included in the device and off of the antenna module 215. Combinations of different sensors may be used to detect the presence of a human, and in some cases, combining different sensors may include integrating each sensor into the device and with each other. Such integration may result in extra time and money spent by an OEM.

Additionally, using sensors to detect a human presence may include accounting for sensor accuracy and field of view, in order to ensure that a human is accurately detected when in the range or field of view of power exposure from a given signal. For example, device 205 may transmit (e.g., radiate) signals (e.g., mmW signals) in a radiating direction 225 from a top face 230 of a housing of the device 205. Signal power may travel in the radiating direction 225 (e.g., radiating direction) and may radiate through the top face 230. Signal power may also radiate through a front face 235, side faces 240, and back face 245 of the housing of the device 205. If PDE is not accounted for, or a human presence is not accurately detected, on non-radiating surfaces (e.g., front face 235, side faces 240, and back face 245), unwanted PDE may occur. For example, device 205 may radiate a signal through its top face 230, and may measure PDE on the top face 230. However, PDE may also occur on the back face 245 of the device 205. In one example, PDE on the back face 245 may be different than the PDE present on the top face 230, for example the PDE at the back face 245 may be 70 percent of the PDE occurring on the top face 230.

In order to account for PDE on non-radiating surfaces (e.g., front face 235, side faces 240, and back face 245), extra sensors may be installed in the device 205 or PDE calculations may be configured to assume the presence of a human on certain faces. In one example, assuming the presence of a human may reduce an uplink duty cycle, for example by 30 percent, in order to meet PDE limits. As described above, integrating extra sensors may result in additional time, cost, or both, for an OEM. As such, device 205 may include a shielding strip 220 including one or more conductive surfaces around the antennas 210 to reduce PDE, reduce manufacturing costs and equipment complexity, and maintain a higher transmit power. For example, shielding strip 220 may reduce PDE in non-radiating directions (e.g., via front face 235, bottom face, side faces 240, and back face 245 in the example of radiating direction 225) without a need for extra sensors or a reduction in transmit power. While a shielding strip 220 is described with respect to an antenna module 215 oriented in a radiating direction 225 through the top face 230, the same principles may be applied to a shielding strip 220 associated with an antenna module 215 oriented in other directions. For example, an antenna module 215 may be oriented in a radiating direction through the front face 235, through any side faces 240, through the back face 245, or through a bottom face of a device 205.

A device 205 configured with a shielding strip 220 may account for shielding introduced by the shielding strip 220 when configuring signal transmissions. For example, device 205 may calculate a transmit power of a signal based on a configuration of shielding strip 220, as well as based on one or more PDE limits. The transmit power calculations may account for a lower resultant PDE due to the presence or existence of shielding strip 220. For example, a lower PDE resulting from shielding strip 220 may be estimated or calculated based on transmission simulation results, PDE measurements (e.g., historical PDE measurements using one or more sensors), or both. The transmit power calculations may be further based on one or more of a beam direction, a height of the shielding strip, a shape of the shielding strip, an adjusted transmit power, or one or more other transmit power parameters, among other examples. In some cases, the calculated transmit power for the signal may be higher than a calculated transmit power for the signal without shielding strip 220 (e.g., transmit power may be higher when shielding strip 220 exists or is present in device 205).

In one example, shielding strip 220 may be oriented on a surface of the antenna module 215 facing the radiating direction 225 (e.g., radiating surface of antenna module 215). Shielding strip 220 may surround all of the antennas 210 of the antenna module, and may conform to any cross-sectional shape to do so. For example, shielding strip 220 may be arranged in a circular, square, oval, rectangular, octagonal, or any other cross-sectional shape that may conform to antenna module 215 and the arrangement of antennas 210. In some cases, shielding strip 220 may be embedded in antenna module 215 and may be flush with the top of antenna module 215. In other cases (e.g., corresponding to a recessed antenna module 215), shielding strip 220 may be embedded in antenna module 215 and may extend away from antenna module 215 a certain distance in the radiating direction 225. In some examples, shielding strip 220 may begin slightly above antenna module 215 and may extend in the radiating direction 225 a certain distance.

In some cases, such as where extending out from the antenna module 215, the shielding strip 220 may be flush with the top face 230 of the housing of the device 205 or may stop a predetermined distance from the top face 230. In some cases, the antenna module 215 may be mounted to the housing of the device 205, and the shielding strip 220 may be formed as part of the housing of the device 205, where the upper edge of the shielding strip 220 may be flush with the housing of the device 205 or recessed a predetermined distance from the housing of the device 205. The height or other physical characteristics of a shielding strip 220 on a particular antenna module 215 may be configured based on one or more factors, such as a predetermined PDE threshold, a field of view of antennas 210, a field of view of a sensor, a shape of the housing for device 205, a communications configuration for device 205, a PD characteristic of one or more communication beams (e.g., transmit beams) of device 205, one or more beam characteristics of device 205, or the like. For example, shielding strip 220 may be configured to have a defined height or shape, or be made out of a defined material, based on a beam coverage achieved (e.g., a maximum beam coverage) while limiting PDE.

Additionally or alternatively, shielding strip 220 may form a part of the housing of the device 205. For example, part of the housing on the front face 235 of the device 205 may form part of a conductive surface that may function as part of shielding strip 220. In one example, a part of a screen 250 (e.g., a back of a screen 250) may form part of a conductive surface of the shielding strip 220. In some cases, the screen 250 may be a liquid crystal display (LCD) screen that includes a conductive surface or plane. Similarly, part of the housing on the back face 245 of the device 205 may form part of a conductive surface or plane that may function, at least in part, as part of the shielding strip 220.

Figure 3A:
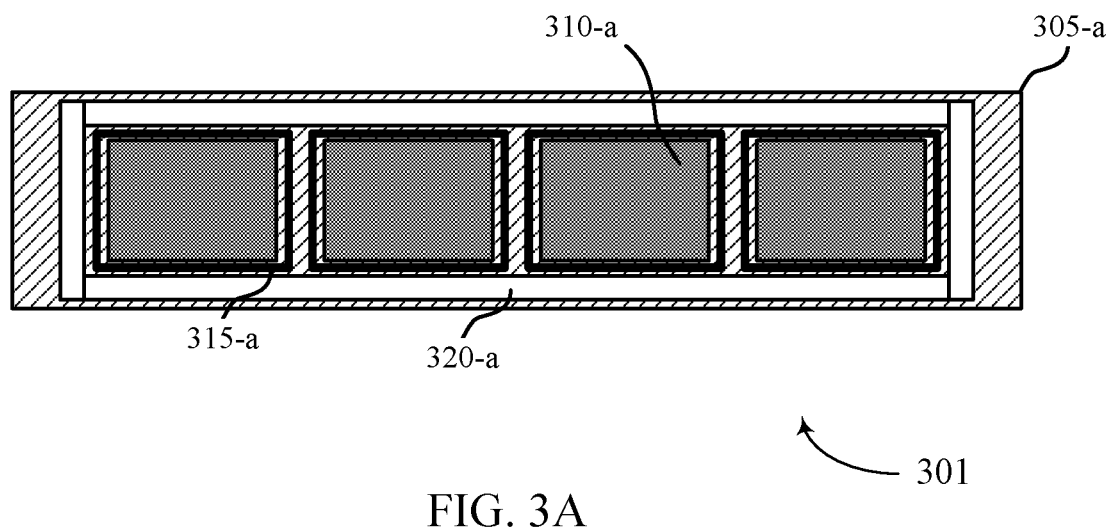
FIGS. 3A and 3B illustrate examples of antenna module configurations that support antenna module placement and housing for reduced PDE in accordance with aspects of the present disclosure.
Figure 3B:
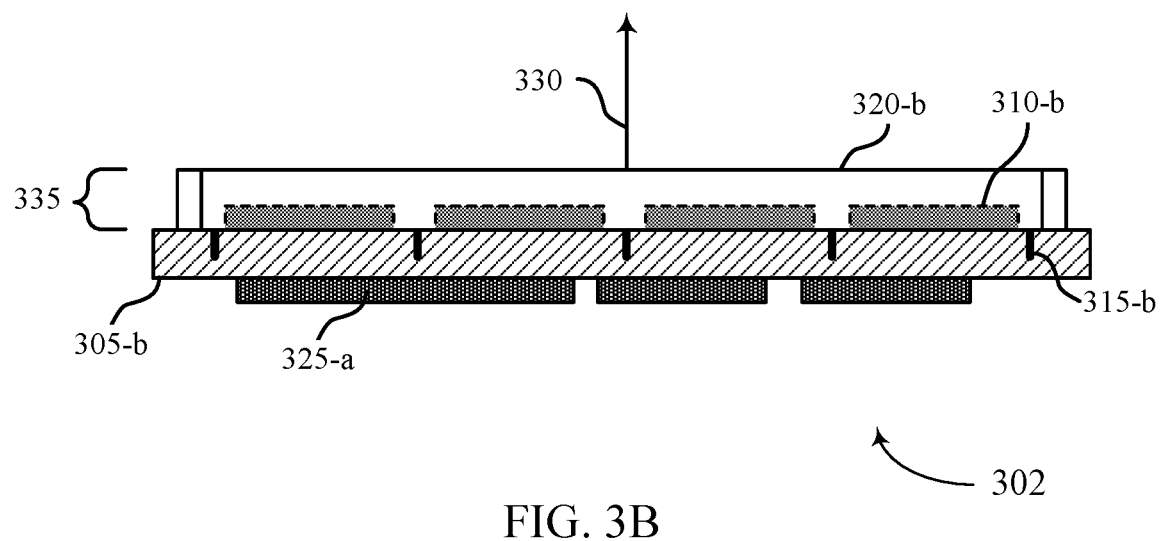

FIGS. 3A and 3B illustrate examples of antenna module configurations 301 and 302 that support antenna module placement and housing for reduced PDE in accordance with aspects of the present disclosure. In some examples, antenna module configurations 301 and 302 may implement aspects of wireless communication system 100, and in some cases, antenna module configurations 301 or 302 may be included in an antenna module of a device, which may be an example of a device 205 described with reference to FIG. 2. In some cases, the device may represent a UE 115 described with reference to FIG. 1. As described with reference to FIGS. 1 and 2, the device may send and receive wireless signals using one or more antenna elements 310 of antenna module configuration 301 or 302, where antenna module configurations 301 and 302 may include a shielding strip 320 to limit PDE. Antenna module configuration 301 may illustrate an example of an antenna module as viewed from a radiating direction 330 (e.g., from the top face or radiating face of the antenna module). Antenna module configuration 302 may illustrate an example of an antenna module as viewed from a direction perpendicular to the radiating direction 330 (e.g., from a side face of the antenna module when the radiating direction 330 is through a top face of a device, such as a device 205).

Antenna module configurations 301 and 302 may include a substrate 305, antenna elements 310 (e.g., patch antennas, slot antennas, dipole antennas, etc.), plating members 315, shielding strip 320, and other electrical components 325. Examples of a substrate 305, antenna elements 310, plating members 315, and a shielding strip 320 may respectively include and refer to substrates 305-a and/or 305-b, antenna elements 310-a and/or 310-b, plating members 315-a and/or 315-b, and shielding strips 320-a and/or 320-b, among other examples.

In some cases, the substrate 305 may be configured as a base structure for antenna module configurations 301 and 302. For example, the substrate 305 may be used to house antenna elements 310, electrical components 325, plating members 315, and the shielding strip 320. Antennas elements 310 and other components may be formed with, attached to, bonded to, adhered to, or otherwise coupled with a substrate 305. In some cases, the antenna elements 310 may be coupled with a substrate 305 (e.g., on a first surface of the substrate 305) and may be above, at, or within the first surface of the substrate 305. In some examples, the substrate 305 may be an example of a printed circuit board (PCB), where the PCB may include one or more power and ground planes and electrical connections for antenna elements 310, electrical components 325, and other portions of the device. In some cases, the substrate 305 (e.g., the PCB) may include one or more plating members 315 enclosing each antenna element of antenna elements 310, where the plating members 315 may be fully or partially formed in the substrate 305.

The plating members 315 may be configured to shield PCB components, electrical components 325, or other portions of the device from power associated with radiated signals. As such, plating members 315 may extend a certain distance into the substrate 305, which may be based on a shielding configuration. A cross-sectional shape of the plating members 315 may be a square, circular, rectangular, octagonal, oval, or other shape, and may be based on the shielding configuration. In some cases, antenna module configuration 301 or 302 may include connected plating members 315 or may be configured such that only one plating member 315 is included in the antenna module configuration 301 or 302.

One or more antenna elements 310 may be formed on the substrate 305 and may include one or more patch, slot, dipole, or other antennas. Together, the one or more antenna elements 310 may form an antenna array for transmitting and receiving signals (e.g., mmW and/or beamformed signals) at the device. The antenna elements 310 may be configured for transmitting and receiving wireless signals in one or more directions. For example, antenna elements 310 may be configured to receive and transmit signals in the radiating direction 330, and may further be configured to receive and transmit signals or directional elements of signals from similar directions, additional to radiating direction 330. As such, antenna elements 310 may be formed on a radiating surface (e.g., top surface) of the substrate 305 of antenna module configurations 301 and 302.

In some examples, antenna elements 310 may be linearly arranged, as illustrated for antenna module configurations 301 and 302. Such linear arrangements may provide for a compact arrangement for a UE 115 or device 205 into which such antenna module configuration 301 or 302 is implemented, while providing for beamforming using multiple antenna elements. While four antenna elements 310 are illustrated for antenna module configurations 301 and 302, a different number of antenna elements may be used. For example two, three or six antenna elements may be linearly arranged, and also be capable of beamforming.

Similarly, an N×M dimensional array (where N is an integer greater than or equal to one, and M is a same or different integer greater than or equal to one) of antenna elements (e.g., two by two, or two by four, etc.) may also be used and provide for multi-directional beamforming. In these examples, a shielding strip 320 may also result in reduced PDE relative to the absence of such shielding strip 320.

One or more electrical components 325 may also be formed on the substrate 305 and may include microprocessors, modems, or other passive or active electrical components. The one or more electrical components 325 may be formed on a different surface from the radiating surface, such as on an opposite surface. In some cases, the electrical components 325 may be shielded from power associated with radiated (e.g., transmitted) signals by the ground plane of the PCB or by the one or more plating members 315. In some examples, one or more passive or active electrical components may be on the same side of the PCB as the radiating surface, but outside the area enclosed by shielding strip 320. In some examples, the area enclosed by shielding strip 320 is exclusive of electrical components other than antenna elements 310, such that the electrical components other than the antenna elements 310 of antenna module configurations 301 and 302 are constrained to be exterior to the area of the radiating surface enclosed by or encircling the shielding strip 320.

The shielding strip 320 may also be formed on the substrate 305 on the radiating surface of antenna module configurations 301 and 302. Shielding strip 320 may include a conductive material that surrounds the antenna elements 310, encircling, enclosing, or otherwise forming a perimeter around antenna elements 310. The shielding strip 320 may be configured in any cross-sectional shape, as described with reference to FIG. 2. In some cases, shielding strip 320 may be embedded in the substrate 305, formed on substrate 305, or may begin at or above the substrate 305 or the top of antenna elements 310 (e.g., the top with reference to the radiating direction 330). For example, a gap may exist between a bottom edge of shielding strip 320 and the substrate 305, such that the bottom edge of shielding strip 320 may begin above the substrate 305 with a gap (e.g., a predetermined distance) between the shielding strip 320 and the substrate 305. In some examples, there may be a supporting mechanism to support the shielding strip 320, where, for example, the supporting mechanism may be made of an insulator. For example, the supporting mechanism may be placed between the shielding strip 320 and the substrate or between the shielding strip 320 and the housing of the device, among other examples.

In some examples, the shielding strip 320 may be formed as part of the housing of the device, where an upper edge of the shielding strip 320 may be flush with the housing of the device, and the lower edge of the shielding strip 320 may be above the substrate 305 by a distance or may be flush with the substrate. It should be appreciated that although the term "above" may describe a situation in which the shielding strip is above the substrate or the like by a distance, the term "above" may also describe a situation in which the shielding strip is "at" or flush with the substrate or the like, that is, in which the "distance" may be zero. Shielding strip 320 may extend away from the substrate 305 a shield height 335 in the radiating direction 330 (e.g., shielding strip 320 may be partially or fully external to the substrate 305). In some cases, the shield height 335 may be based on a distance to a top surface of a housing of the device (e.g., a distance from a bottom point, top point, or middle point of the shielding strip 320 to the top surface of the housing) or may be based on a form factor of the device. Additionally or alternatively, the height of shielding strip 320 may be based on a predetermined PDE threshold, a field of view of antenna elements 310 (e.g., a desired field of view), a field of view of a sensor (e.g., a desired field of view), a communications configuration for the device, or the like.

In some examples, the top of antenna elements 310 (e.g., or a highest point of antenna elements 310) in the radiating direction 330 from the substrate 305 may define a first plane. In other examples, the first plane may be defined by a lowest point of antenna elements 310, or the first plane may be defined by an intermediate point (e.g., a mid-point) in the height of the antenna elements 310. The first plane may be substantially parallel to the surface of the substrate 305 with the radiating elements (e.g., the antenna elements 310). The shielding strip 320 may extend in the radiating direction 330 from the substrate 305 starting at or above the first plane. In some examples, no portion of the shielding strip 320 may enclose the antenna elements 310 below the first plane (e.g., between the first plane and the substrate 305, or below the radiating surface of the substrate 305). In some examples, such as when the shielding strip 320 may be electrically coupled to ground, for example via a ground plane of a PCB, connectors to the shielding strip 320 may cross the first plane to the substrate while the shielding strip 320 itself may be at or above the first plane.

In some examples, shielding strip 320 (e.g., at a selected segment) may be greater in cross-sectional width than in cross-sectional height. Taking the upper segment or the left segment of shielding strip 320-*a* shown in FIG. 3A as an example of the selected segment, in the cross section obtained when cutting this segment in the direction perpendicular to it, the cross-sectional width may be greater than the cross-sectional height. In other examples, shielding strip 320 may be greater in cross-sectional height than in cross-sectional width. In yet other examples, the height and width of the shielding strip 320 as viewed in a cross section may be substantially equal. In some cases, the height and/or width of the shielding strip 320 may be determined based at least in part on a field of view for the antenna module configuration 301 and 302, the expected transmit power for the antenna module configuration 301 and 302, or a predetermined PDE applicable for a wireless device (e.g., a UE 115) into which antenna module configuration 301 and 302 is to be installed, or some combination of these factors. Additionally or alternatively, the height and/or width of the shielding strip 320 may be determined based on a design of the housing of the device.

In some examples, shielding strip 320 may follow a perimeter of the substrate 305 (e.g., PCB) and may be coincident with or offset from the perimeter. In some cases, shielding strip 320 may be formed at or above the perimeter of the substrate 305. In some cases, shielding strip 320 may be electrically coupled with ground such as a ground plane of the substrate, while in other cases, shielding strip 320 may be electrically isolated from the ground plane (e.g., floating). In some cases, the configuration of shielding strip 320 with respect to the ground plane (e.g., a coupled or isolated configuration) may be based on a transmit power, an amount of PDE reduction, or a field of view of antenna module configuration 301 or 302.

Shielding strip 320 may be formed from a conductor, such as a metal (e.g., copper, aluminum, silver, etc.), a conductive alloy (e.g., various aluminum alloys), a transparent conductive oxide (e.g., zinc oxide (ZnO), indium tin oxide (ITO)), or a doped semiconductor (e.g., doped polycrystalline silicon). In some examples, shielding strip 320 may be formed using a single, uniform material. In other examples, shielding strip 320 may be formed from two or more different materials, for example in layers of different conductors stacked on top of each other on or above substrate 305. In some cases, shielding strip 320 may be formed (e.g., plated) onto a housing (e.g., plastic housing) of the device.

Figure 4A:
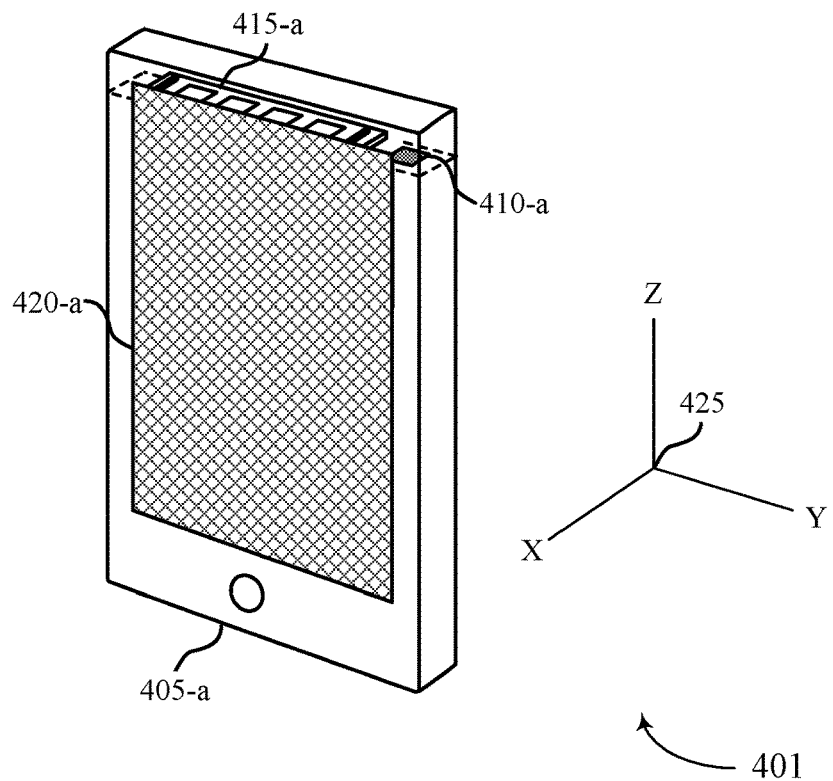
FIGS. 4A and 4B illustrate example of device configurations that support antenna module placement and housing for reduced PDE in accordance with aspects of the present disclosure.
Figure 4B:
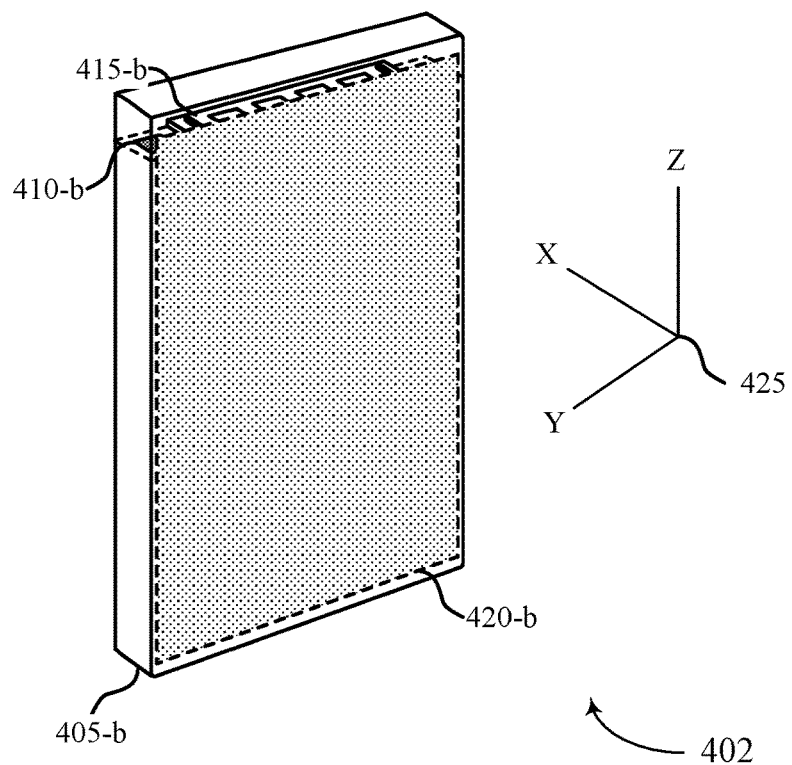

FIGS. 4A and 4B illustrate examples of device configurations 401 and 402 that support antenna module placement and housing for reduced PDE in accordance with aspects of the present disclosure. In some examples, device configurations 401 and 402 may implement aspects of wireless communication system 100, and in some cases, device configurations 401 and 402 may represent configurations of a device 405 which may be an example of a device 205 described with reference to FIG. 2. In some cases, the device may represent a UE 115 described with reference to FIG. 1. Examples of a device 405 may include and refer to devices 405-*a* and/or 405-*b*, among other examples. As described with reference to FIGS. 1-3, the device 405 may send and receive wireless signals using one or more antenna modules 415 housed in the device 405, where the one or more antenna modules 415 may include aspects of an antenna module configuration 301 or 302 described with reference to FIG. 3. An antenna module 415 of device configuration 401 or 402 may include a shielding strip or shielding strip elements to limit PDE when transmitting signals (e.g., mmW and/or beamformed signals).

Device configuration 401 may represent a device 405-*a* as viewed from a front face of the device 405-*a* (e.g., in a positive X direction of a coordinate system 425), while device configuration 402 may represent a device 405-*b* as viewed from a back face of the device 405-*b* (e.g., in the negative X direction of coordinate system 425). Devices 405-*a* and 405-*b* may include one or more sensors 410 associated with the one or more antenna modules 415 of the corresponding device 405. The sensors 410 may correspond to the antenna modules 415 on a one-to-one, one-to-many, or many-to-one basis. A sensor 410 of device 405-*a* or 405-*b* may be an internal sensor (e.g., internal to an antenna module 415) or an external sensor, as described with reference to FIG. 2. In some cases, a shape (e.g., height) of a shielding strip or shielding strip elements of an antenna module 415 may be based on a field of view of a sensor 410 corresponding to the antenna module 415 (e.g., in order to maintain a given field of view). Examples of sensors 410 and an antenna module 415 may respectively include and refer to sensors 410-*a* and/or 410-*b* and antenna modules 415-*a* and/or 415-*b*, among other examples.

In some cases, the antenna module 415 may include antenna elements oriented on a plane (e.g., on a radiating surface of the antenna module 415 facing a positive Z direction of coordinate system 425). In some examples of device 405-*a* or 405-*b*, the shielding strip of the antenna module 415 may surround the antenna elements (e.g., as viewed in the positive Z direction), and the shielding strip may form any cross-sectional shape when viewed in the positive Z direction. For example, the cross-sectional shape of the shielding strip when viewed in the positive Z direction may be substantially a rectangle, a circle, an oval, or any other shape. In other examples of device 405-*a* or 405-*b* (e.g., as illustrated in FIGS. 4A and 4B), shielding strip elements may not be formed on one or more portions of the antenna module 415 (e.g., oriented towards one or more faces of device 405-*a* or 405-*b*), such that the one or more portions of antenna module 415 may be shielded by one or more conductive surfaces 420. In such cases, the shielding strip elements of the antenna module 415, together with the one or more conductive surfaces 420, may form the shielding strip of the antenna module 415. In some cases, the one or more conductive surfaces 420 may be formed (e.g., plated) onto a housing (e.g., plastic housing, screen, etc.) of device 405-*a* or 405-*b*. Examples of a conductive surface 420 may include and refer to conductive surfaces 420-*a* and/or 420-*b*, among other examples.

In a first example, shielding strip elements may be included at ends of the antenna module 415 facing positive and negative Y directions of coordinate system 425, but may not be included at portions of the antenna module 415 facing the positive and negative X directions. In a second example, shielding strip elements may not be included on any portion of the antenna module 415. In some examples, only one portion of the antenna module (e.g., facing the positive X direction) may not include a shielding strip element. In other examples, only one portion of the antenna module (e.g., facing the negative X direction) may include a shielding strip element. Any portion of the antenna module (e.g., facing a given surface or partially facing a given surface of device 405-*a* or 405-*b*) may selectively be configured with a shielding strip element or without a shielding strip element. In cases where one or more portions of the antenna module are not configured with a shielding strip element, device 405-*a* or 405-*b* may instead include one or more conductive surfaces 420 for shielding the antenna module 415 on the corresponding portions of the antenna module 415. In some examples, a shielding strip may include at least part of the housing of the device 405. In some examples, the antenna module 415 may be mounted to the housing of the device 405, and the shielding strip may include a part of the housing of the device 405, where an upper edge, one or more side edges, or both of the shielding strip may be flush with the housing of the device 405.

For example, device 405-*a* may include a conductive surface 420-*a* within a front surface (e.g., facing the positive X direction) of a housing of device 405-*a*. In some cases, conductive surface 420-*a* may be part of a screen (e.g., an LCD screen) of device 405-*a*, such as a backing or ground plane of the screen. In another example, device 405-*b* may include a conductive surface 420-*b* within or on a back surface or face (e.g., facing the negative X direction) of a housing of device 405-*b*. In some examples, devices 405-*a* and 405-*b* may include one or more of conductive surfaces 420-*a*, 420-*b*, or conductive surfaces 420 oriented towards side faces (e.g., facing the positive and negative Y directions) of the housing of device 405-*a* or 405-*b*. While a shielding strip is described with respect to an antenna module 415 with a radiating surface oriented in the positive Z direction, the same principles may be applied to a shielding strip associated with an antenna module 415 oriented in other directions. For example, an antenna module 415 may be oriented in a radiating direction in the negative Z direction, negative or positive X direction, or negative or positive Y direction. Additionally or alternatively, the antenna module 415 may be installed on any edge (i.e., side) or face of the device 405-*a* (e.g., a top edge, a bottom edge, a side edge, a front face, or a back face).

The amount, size, and orientation of one or more conductive surfaces 420 included within a device may be based on the configuration of the shielding strip or shielding strip elements for the antenna module 415, as described above, as well as other device factors (e.g., form factors, manufacturing concerns, cost, performance, etc.). For example, the antenna module 415 may be arranged in the housing such that a relative position of the one or more conductive surfaces 420 and the antenna module 415 creates a shielding strip formed by the one or more conductive surfaces 420 (and any shielding strip elements included on a portion of the antenna module 415) that has a shape that encloses or surrounds the set of antenna elements to reduce PDE. The shape (e.g., height) may be based on a field of view of a sensor 410 corresponding to the antenna module 415 (e.g., in order to maintain a field of view for the sensor 410). Additionally or alternatively, the shape (e.g., height) may be based on supported communication beam directions for the antenna module 415. In some cases, a shielding strip for the antenna module may be formed entirely of conductive surfaces 420 within the housing of a device 405.

Figure 5:
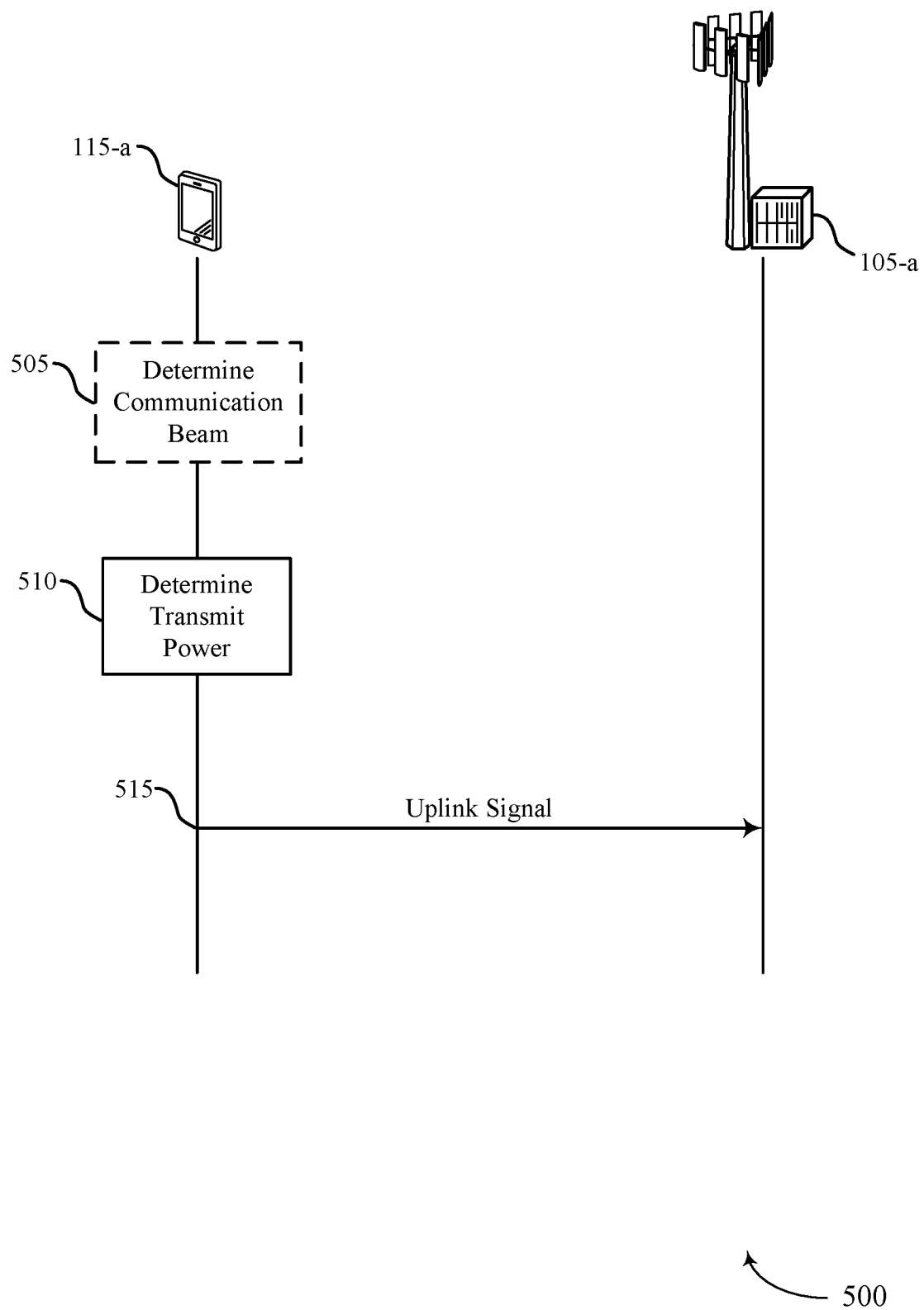
FIG. 5 illustrates an example of a process flow that supports antenna module placement and housing for reduced PDE in accordance with aspects of the present disclosure.

FIG. 5 illustrates an example of a process flow 500 that supports antenna module placement and housing for reduced PDE in accordance with aspects of the present disclosure. In some examples, process flow 500 may implement aspects of wireless communications systems 100 and may be implemented by a UE 115-*a* and a base station 105-*a*, which may be examples of a UE 115 and a base station 105 described with reference to FIG. 1. The UE 115-*a* may also be an example of a device described with reference to FIGS. 2-4, and may include one or more antenna modules for communications with base station 105-*a*, which may be examples of an antenna module described with reference to FIGS. 2-4. For example, the one or more antenna modules of UE 115-*a* may each include a set of antenna elements and a shielding strip enclosing or surrounding the set of antenna elements to reduce PDE. Additionally or alternatively, portions of UE 115-*a* may contain conductive surfaces that act as a shielding strip to the one or more antenna modules.

In the following description of the process flow 500, the operations between UE 115-*a* and base station 105-*a* may be transmitted in a different order than the order shown, or the operations performed by base station 105-*a* and UE 115-*a* may be performed in different orders or at different times. Certain operations may also be left out of the process flow 500, or other operations may be added to the process flow 500. It is to be understood that while base station 105-*a* and UE 115-*a* are shown performing a number of the operations of process flow 500, any wireless device may perform the operations shown.

At 505, in some cases, UE 115-*a* may determine a communication beam. In some examples, determining a communication beam may include identifying one or more candidate beams based on one or more signals (e.g., downlink signals) received by UE 115-*a*. UE 115-*a* may determine respective PDE characteristics for each of the candidate beams and may select the communication beam from the candidate communication beams. UE 115-*a* may select the communication beam based on the PDE characteristics of the candidate beams (e.g., assuming the shielding strip is in use). In some cases, the UE 115-*a* may select the communication beam based on an uplink grant for the UE 115-*a*, or a power level of the UE 115-*a*, or a projected PDE of the communication beam (e.g., based on a detector or not based on a detector), or a combination thereof. In some cases, UE 115-*a* may implement a detector. Based on the presence of the detector (e.g., using the detector), the UE 115-*a* may determine a level of PDE of the communication beam. UE 115-*a* may select the communication beam based on the detected level of PDE, or a detector characterization, or a combination thereof.

In some implementations, the shielding strip for UE 115-*a* may be designed to change (e.g., reduce) the PD distribution for each communication beam (i.e., transmit beam) at UE 115-*a*. For example, the shielding strip may be designed based on the PD characteristics and beam characteristics at UE 115-*a* to reduce PDE while maintaining (e.g., maximizing) beam coverage of the UE 115-*a*. The PDE of a communication may be a function of the communication beam selected by UE 115-*a*, and UE 115-*a* may therefore select the communication beam in order to meet PDE threshold requirements, limit PDE, or the like. UE 115-*a* may further select the communication beam based on the shielding strip. UE 115-*a* may factor the shielding strip into communication beam selection based on beam-specific PDE. For example, an OEM may measure the PD distribution of each beam for a given device with the shielding strip installed and may store this information at UE 115-*a* or may otherwise provide this information to UE 115-*a* (e.g., via signaling from base station 105-*a*). In this way, the shielding strip may be factored into the characterization of the PD distribution for each communication beam of UE 115-*a*, and UE 115-*a* may select a communication beam for transmission based on the PD distribution characterizations (and, therefore, implicitly based on the shielding strip).

At 510, UE 115-*a* may determine a transmit power for the communication beam of the UE 115-*a* based on a PDE threshold for the communication beam and a shielding strip enclosing a set of antenna elements and extending away from a first surface of an antenna module. In some examples, the antenna module may include the shielding strip, or the antenna module may be mounted to a housing of UE 115-*a* and the shielding strip may be part of the housing of UE 115-*a*. In one example, UE 115-*a* may identify a PDE limit or threshold and may use the properties of the shielding strip to determine a transmit power that may meet the PDE limit or threshold with the shielding strip in place (e.g., based on the existence of the shielding strip). In some cases, the transmit power based on the PDE threshold and shielding strip may be higher than a transmit power based on the PDE threshold alone (e.g., if UE 115-*a* did not have a shielding strip, or if a shielding strip did not exist or were not present on the UE 115-*a*).

In one example, UE 115-*a* may determine a preliminary transmit power for an uplink signal (e.g., mmW and/or beamformed signal) based on a number of factors such as a transmit power control (TPC) command, a link budget, a field of view of the antenna module, etc. UE 115-*a* may compare the preliminary transmit power to a maximum transmit power based on the presence and configuration of the shielding strip and may determine the lower of the two as the transmit power.

At 515, UE 115-*a* may transmit the uplink signal using the antenna module and the communication beam, to base station 105-*a*, according to the determined transmit power. In some cases, UE 115-*a* may transmit the uplink signal by weighting the antenna elements of the antenna module according to a beamforming scheme to create a beamformed signal. In some cases, the uplink signal (e.g., a beamformed signal) may be a mmW signal.

In some examples, UE 115-*a* may include one or more additional antenna modules, such as a second antenna module including a second set of antenna elements and a second shielding strip enclosing the second set of antenna elements and extending away from the second set of antenna elements above a second surface of the second antenna module (e.g., a radiating face of the second antenna module). Accordingly, UE 115-*a* may determine a second transmit power for a second communication beam of the UE 115-*a* based on a second PDE threshold for the second communication beam and the second shielding strip enclosing the second set of antenna elements, and may transmit a second uplink signal using the second antenna module and the second communication beam based on the determined second transmit power. In some cases, determining the transmit power and identifying the second transmit power may be based on a same TPC mechanism as for the first antenna module. For example, UE 115-*a* may perform functions similar to those described at 505, 510, and 515 in order to determine the second transmit power and transmit the second uplink signal.

Figure 6:
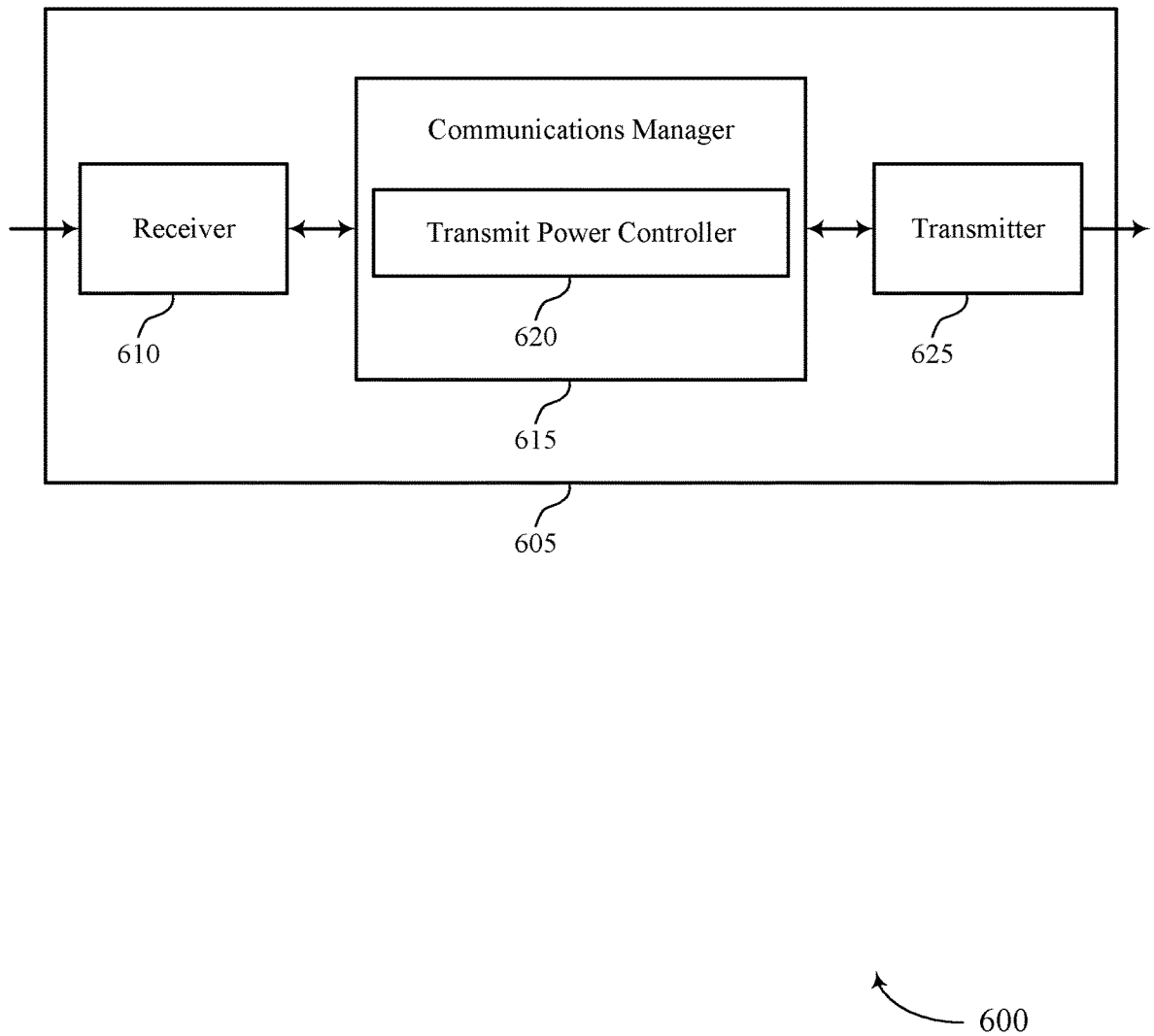
FIG. 6 shows a block diagram of a device that supports antenna module placement and housing for reduced PDE in accordance with aspects of the present disclosure.

FIG. 6 shows a block diagram 600 of a device 605 that supports antenna module placement and housing for reduced PDE in accordance with aspects of the present disclosure. The device 605 may be an example of aspects of an antenna module, a UE 115, or both as described herein. The device 605 may include a receiver 610, a communications manager 615, and a transmitter 625. The device 605 may also include a processor. Each of these components may be in communication with one another (e.g., via one or more buses).

The receiver 610 may receive information such as packets, user data, or control information associated with various information channels (e.g., control channels, data channels, etc.). Information may be passed on to other components of the device 605. The receiver 610 may be an example of aspects of the transceiver 720 described with reference to FIG. 7. The receiver 610 may utilize a single antenna or a set of antennas (e.g., in an antenna module).

The communications manager 615 may include a transmit power controller 620. In some cases, the communications manager 615 may be an example of aspects of the communications manager 710 described herein. The communications manager 615 may be implemented at a UE. The transmit power controller 620 may determine a transmit power for a communication beam of the UE based on a PDE threshold for the communication beam and a shielding strip enclosing a set of antenna elements on a first surface of an antenna module of the UE, the shielding strip enclosing the set of antenna elements above the first surface and transmit (e.g., via the transmitter 625), using the communication beam and according to the determined transmit power, a signal (e.g., an uplink signal, a sidelink signal, etc.) using the antenna module.

In some examples, the antenna module includes the shielding strip. In some other examples, the antenna module is mounted to a housing of the UE, and the shielding strip is part of the housing of the UE, or the shielding strip includes at least a part of the housing of the UE.

In some cases, the transmit power controller 620 may additionally identify a maximum transmit power for the communication beam based on the PDE threshold for the communication beam and the shielding strip enclosing the set of antenna elements, where the transmit power is determined based on the identified maximum transmit power.

In some cases, the transmit power controller 620 may additionally identify one or more candidate communication beams of the UE, determine a respective PDE characteristic for each of the one or more candidate communication beams, and select the communication beam from the one or more candidate communication beams. In some cases, the communication beam includes a first PDE characteristic, and determining the transmit power for the communication beam is based on the first PDE characteristic, and selecting the communication beam is based on at least an uplink grant for the UE, or a power level of the UE, or a projected PDE of the communication beam, or the first PDE characteristic, or a combination thereof. The first PDE characteristic may be based on the design of the shielding strip. In some examples, the UE includes a detector, and the detector may detect a level of PDE of the communication beam, where selecting the communication beam is based on the detected level of PDE.

In some cases, the transmit power controller 620 may additionally determine a second transmit power for a second communication beam of the UE based on a second PDE threshold for a second communication beam and a second shielding strip enclosing a second set of antenna elements of a second antenna module of the UE, the second shielding strip extending away from the second set of antenna elements above a second surface of the second antenna module. In some of these cases, the communications manager 615 may transmit (e.g., via the transmitter 625) a second signal using the second antenna module and the second communication beam based on the determined second transmit power. In some examples, determining the transmit power and determining the second transmit power may be based on a same transmit power control mechanism (e.g., the transmit power controller 620).

The communications manager 615 may be an example of aspects of the communications manager 710 described herein. The actions performed by the communications manager 615 as described herein may be implemented to realize one or more potential advantages. For example, the shielding strip around the set of antenna elements of an antenna module may reduce PDE due to transmissions of the antenna module. Accordingly, a UE 115 may implement a greater maximum transmit power for the antenna module while maintaining compliance with a maximum PDE threshold based on the shielding strip. This greater maximum transmit power supports more reliable transmissions (e.g., uplink transmissions, sidelink transmissions, etc.) by the UE 115, as the UE 115 can select a greater transmit power value for transmission in busy or unreliable channels.

Based on transmitting using a transmit power selected according to a greater maximum transmit power, a processor of the UE 115 (e.g., controlling the receiver 610, the communications manager 615, the transmitter 625, etc.) may reduce processing resources used for retransmission and/or PD sensing. For example, implementing the shielding strip around the antenna elements of the antenna module may improve transmission reliability of the UE 115 due to the greater maximum transmit power supported by the UE 115 (e.g., while maintain a level of PDE below the maximum PDE threshold). As such, the UE 115 may reduce the number of retransmissions used to successfully transmit a message. Reducing the number of retransmissions may reduce a number of times the processor ramps up processing power and turns on processing units to handle uplink and/or sidelink message encoding and transmission. This reduced number of retransmissions may also reduce signaling overhead on an uplink channel, a sidelink channel, or both (e.g., in addition to reducing the processing overhead at the processor). Furthermore, the shielding strip may reduce PD distribution outside of a field of view of the antenna module.

The UE 115 may reduce, or not implement at all, sensing outside the field of view of the antenna module due to the effects of the shielding strip. Reducing sensing operations may reduce the power overhead associated with PD sensors.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 625 may transmit signals generated by other components of the device 605. In some examples, the transmitter 625 may be collocated with a receiver 610 in a transceiver module. For example, the transmitter 625 may be an example of aspects of the transceiver 720 described with reference to FIG. 7. The transmitter 625 may utilize a single antenna or a set of antennas (e.g., in an antenna module).

Figure 7:
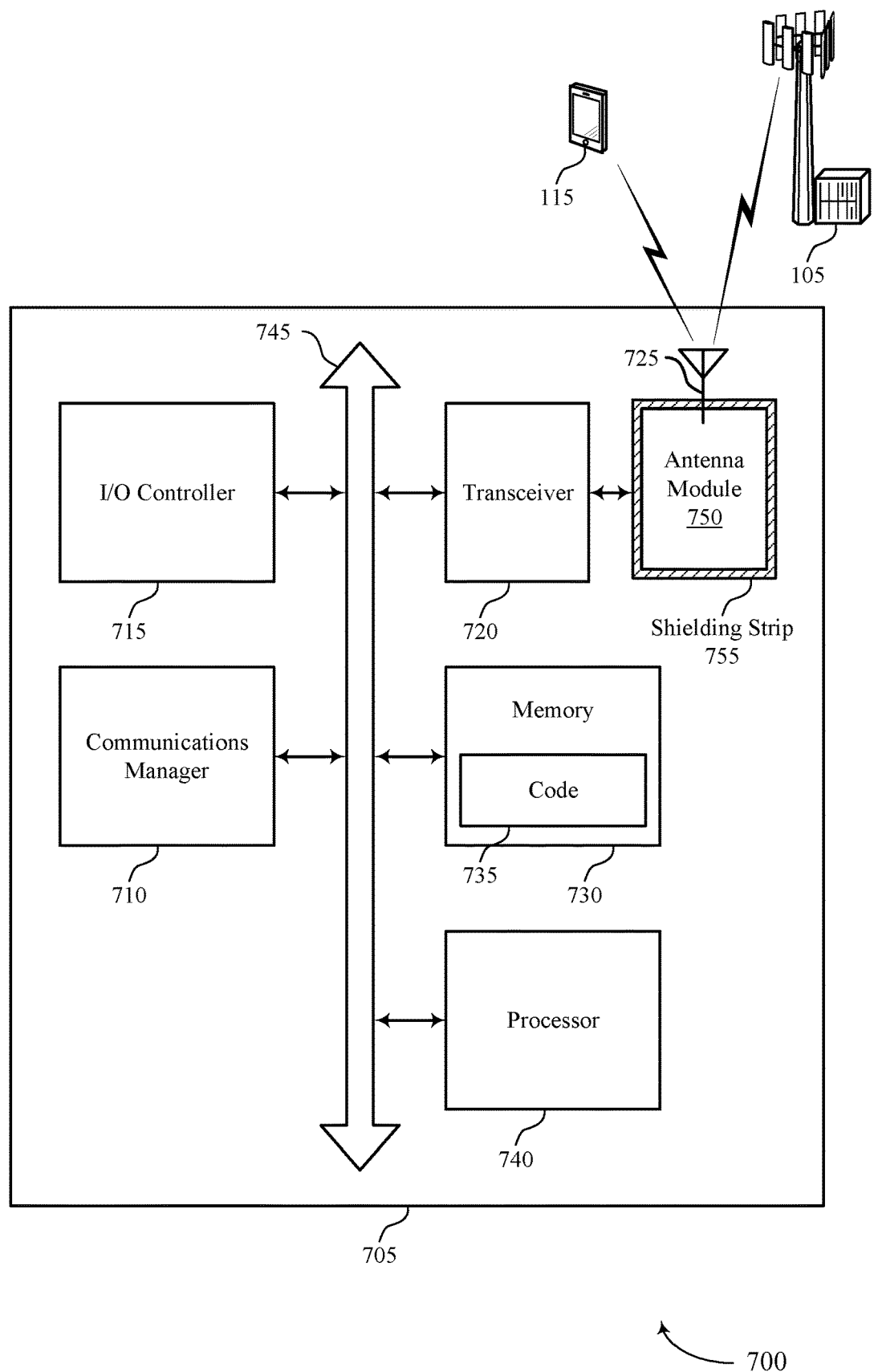
FIG. 7 shows a diagram of a system including a device that supports antenna module placement and housing for reduced PDE in accordance with aspects of the present disclosure.

FIG. 7 shows a diagram of a system 700 including a device 705 that supports antenna module placement and housing for reduced PDE in accordance with aspects of the present disclosure. The device 705 may be an example of or include the components of device 605 or a UE 115 as described herein. The device 705 may include components for bi-directional voice and data communications including components for transmitting and receiving communications, including a communications manager 710, an I/O controller 715, a transceiver 720, an antenna 725, memory 730, a processor 740, and an antenna module 750. These components may be in electronic communication via one or more buses (e.g., bus 745).

The communications manager 710 may be implemented at a UE 115 (e.g., as part of or supporting an antenna module 750). The communications manager 710 may determine a transmit power for a communication beam of the UE 115 based on a PDE threshold for the communication beam and a shielding strip 755 enclosing a set of antenna elements on a first surface of an antenna module 750 of the UE 115, the shielding strip 755 enclosing the set of antenna elements above the first surface. The communications manager 710 may transmit, using the communication beam and according to the determined transmit power, an uplink signal using the antenna module 750.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions. The antenna 725 may be an example of an antenna element or a set of antenna elements, and the antenna 725 may be a component of an antenna module 750 placed and/or housed within the UE 115 (e.g., the device 705) for reduced PDE.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The antenna module 750 may include a substrate having a first surface and a set of antenna elements (e.g., including antenna 725) on the first surface. The shielding strip 755 may enclose the set of antenna elements and extend away from the first surface. In some cases, a lower edge of the shielding strip 755 may be at or above the first surface.

In some examples, the substrate of the antenna module 750 may include a PCB, where the set of antennas may be on the PCB and the shielding strip 755 may be external to the PCB. For example, the shielding strip 755 may be at or above a perimeter of the PCB. In some cases, the PCB may further include a respective plating member enclosing each antenna element of the set of antenna elements, where the plating member is on the PCB.

In some cases, the antenna module 750 may be mounted within or on a housing of the UE 115 (e.g., the device 705), and the shielding strip 755 may be part of the housing of the UE 115. In some cases, the housing may include the shielding strip 755 or include a part of the shielding strip 755. For example, the upper edge of the shielding strip 755 may be configured to be flush with the housing of the UE 115 (e.g., the device 705).

In some cases, the height of the shielding strip 755 from the first surface may be based on at least a predetermined PDE threshold (e.g., a maximum PDE threshold), a field of view for the set of antenna elements, a field of view for a sensor, or a combination thereof. The shielding strip 755 may be electrically coupled to a ground plane of the antenna module 750 or electrically isolated from the ground plane of the antenna module 750.

In some examples, the antenna module 750 may further include one or more electrical components mounted on a second surface of the substrate opposite the first surface. In some cases, the set of antenna elements includes a set of patch antennas forming an antenna array.

In some implementations, the UE 115 (e.g., the device 705) may include a housing having an exterior surface. The antenna module 750 may be mounted within the housing, such that the first surface of the substrate of the antenna module 750 is recessed from the exterior surface of the housing from a radiating direction of the antenna module 750. The shielding strip 755 may enclose the set of antenna elements of the antenna module 750 and extend away from the first surface of the substrate. The shielding strip 755 may be a component of the antenna module 750 or the housing of the UE 115. The upper edge of the shielding strip 755 may be at or below the exterior surface in the radiating direction and may be above the set of antenna elements. For example, as described with reference to FIG. 4, an upper edge of the shielding strip 755 may be at or below a top side of the exterior surface of the housing (e.g., in the Z direction).

In some examples, the exterior surface of the UE 115 (e.g., the device 705) may include a screen oriented on a first side of the antenna module 750 and a back surface oriented on a second side of the antenna module 750 opposite the screen, the back surface including a first conductive surface. The UE 115 may additionally include a second conductive surface oriented on the first side of the antenna module 750 opposite the back surface, where the screen includes the second conductive surface, or the second conductive surface is mounted to the back of the screen.

In some examples, the UE 115 may further include a sensor to measure PDE, where the height of the shielding strip 755 from the first surface may be based on a field of view for the sensor.

Figure 8:
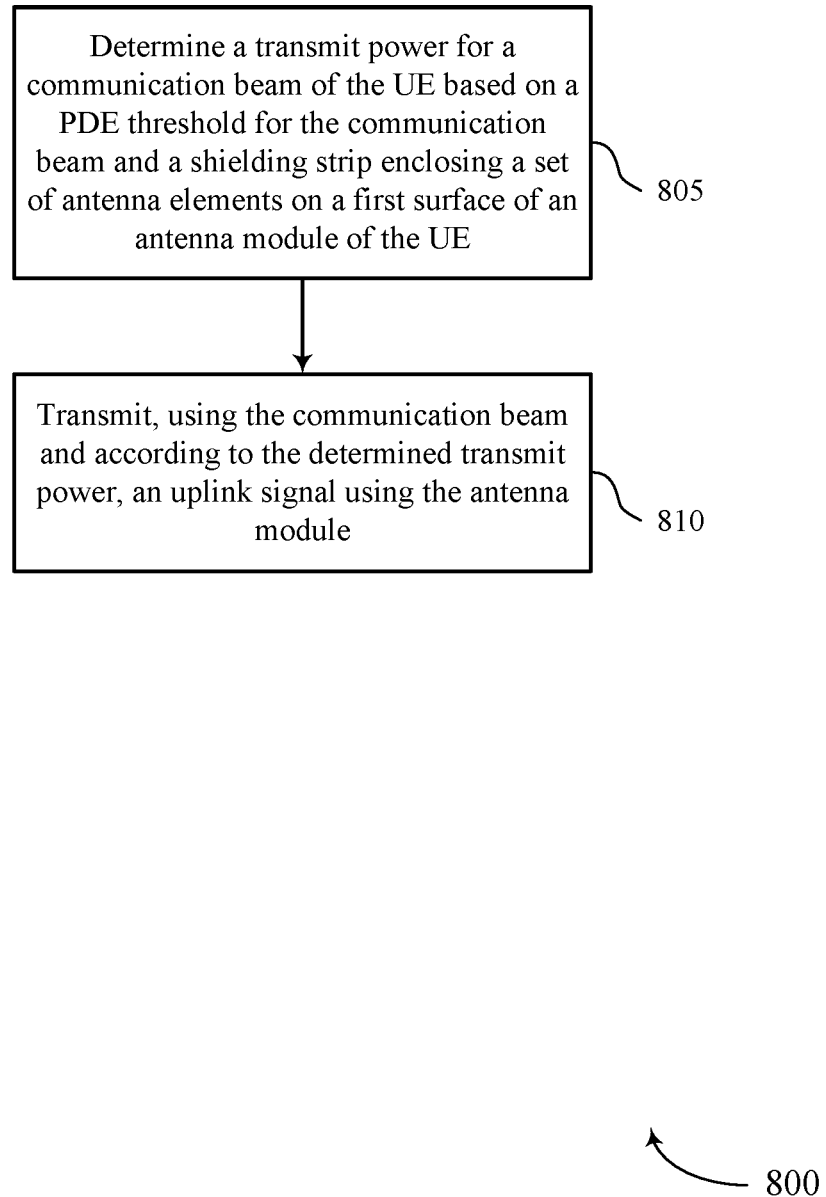
FIGS. 8 and 9 show flowcharts illustrating methods that support antenna module placement and housing for reduced PDE in accordance with aspects of the present disclosure.

FIG. 8 shows a flowchart illustrating a method 800 that supports antenna module placement and housing for reduced PDE in accordance with aspects of the present disclosure. The operations of method 800 may be implemented by a UE 115 or its components as described herein. For example, the operations of method 800 may be performed by a communications manager as described with reference to FIGS. 6 and 7. In some examples, a UE may execute a set of instructions to control the functional elements of the UE to perform the functions described below. Additionally or alternatively, a UE may perform aspects of the functions described below using special-purpose hardware.

At 805, the UE may determine a transmit power for a communication beam of the UE based on a PDE threshold for the communication beam and a shielding strip enclosing a set of antenna elements on a first surface of an antenna module of the UE, the shielding strip enclosing the set of antenna elements above the first surface. The operations of 805 may be performed according to the methods described herein. The operations of 805 may be performed according to the methods described herein. In some examples, aspects of the operations of 805 may be performed by a transmit power controller as described with reference to FIGS. 6 and 7.

At 810, the UE may transmit, using the communication beam and according to the determined transmit power, an uplink signal using the antenna module. The operations of 810 may be performed according to the methods described herein. In some examples, aspects of the operations of 810 may be performed by a transmit power controller as described with reference to FIGS. 6 and 7.

Figure 9:
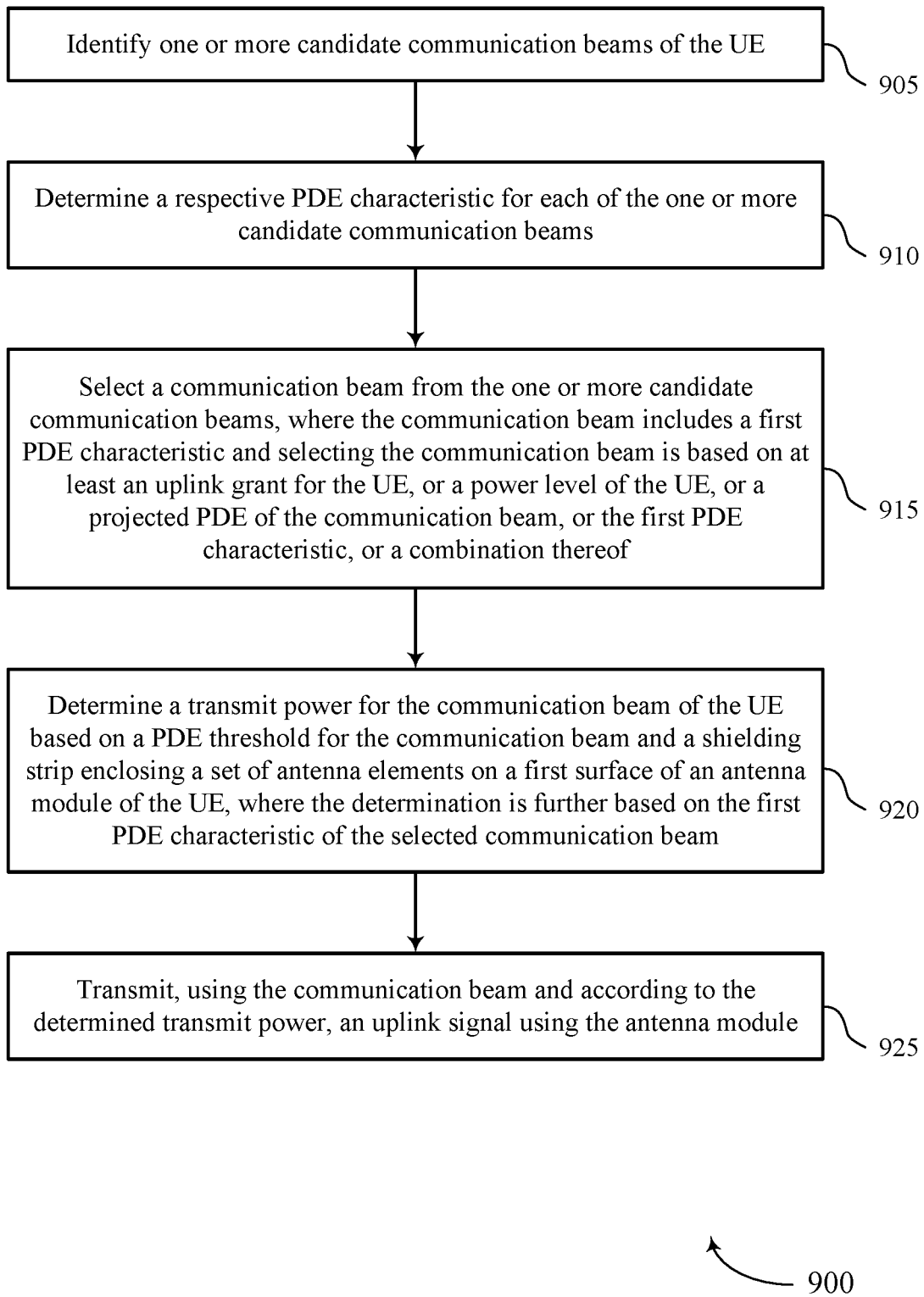

FIG. 9 shows a flowchart illustrating a method 900 that supports antenna module placement and housing for reduced PDE in accordance with aspects of the present disclosure. The operations of method 900 may be implemented by a UE 115 or its components as described herein. For example, the operations of method 900 may be performed by a communications manager as described with reference to FIGS. 6 and 7. In some examples, a UE may execute a set of instructions to control the functional elements of the UE to perform the functions described below. Additionally or alternatively, a UE may perform aspects of the functions described below using special-purpose hardware.

At 905, the UE may identify one or more candidate communication beams of the UE (e.g., based on one or more received signals). The operations of 905 may be performed according to the methods described herein. In some examples, aspects of the operations of 905 may be performed by a transmit power controller as described with reference to FIGS. 6 and 7.

At 910, the UE may determine a respective PDE characteristic for each of the one or more candidate communication beams. The operations of 910 may be performed according to the methods described herein. In some examples, aspects of the operations of 910 may be performed by a transmit power controller as described with reference to FIGS. 6 and 7.

At 915, the UE may select a communication beam from the one or more candidate communication beams, where the communication beam includes a first PDE characteristic. Selecting the communication beam may be based on at least an uplink grant for the UE, or a power level of the UE, or a projected PDE of the communication beam, or the first PDE characteristic, or a combination thereof. The operations of 915 may be performed according to the methods described herein. In some examples, aspects of the operations of 915 may be performed by a transmitter, transceiver, and/or antenna module as described with reference to FIGS. 6 and 7.

At 920, the UE may determine a transmit power for the communication beam of the UE based on a PDE threshold for the communication beam and a shielding strip enclosing a set of antenna elements on a first surface of an antenna module of the UE, where determining the transmit power for the communication beam may be further based on the first PDE characteristic. The operations of 905 may be performed according to the methods described herein. In some examples, aspects of the operations of 905 may be performed by a transmit power controller as described with reference to FIGS. 6 and 7.

At 925, the UE may transmit, using the communication beam and according to the determined transmit power, an uplink signal using the antenna module. The operations of 925 may be performed according to the methods described herein. The operations of 910 may be performed according to the methods described herein. In some examples, aspects of the operations of 910 may be performed by a transmit power controller as described with reference to FIGS. 6 and 7.

It should be noted that the methods described herein describe possible implementations, and that the operations and the steps may be rearranged or otherwise modified and that other implementations are possible. Further, aspects from two or more of the methods may be combined.

Described below are a number of embodiments of methods, systems, or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. The embodiments may include device embodiments, such as an antenna module, a UE, or both. It is to be understood that these are just some examples of possible embodiments, and other examples will be readily apparent to those skilled in the art without departing from the scope of the disclosure.

Embodiment 1

An antenna module, comprising: a substrate having a first surface; a plurality of antenna elements on the first surface; and a shielding strip enclosing the plurality of antenna elements and extending away from the first surface of the substrate, wherein an upper edge of the shielding strip is above the plurality of antenna elements.

Embodiment 2

The antenna module of embodiment 1, wherein a lower edge of the shielding strip is at or above the first surface of the substrate.

Embodiment 3

The antenna module of either of embodiments 1 or 2, wherein the substrate comprises a PCB, the plurality of antenna elements are on the PCB, and the shielding strip is external to the PCB.

Embodiment 4

The antenna module of embodiment 3, wherein the PCB further comprises: a plating member enclosing each antenna element of the plurality of antenna elements, wherein the plating member is formed in on the PCB.

Embodiment 5

The antenna module of either of embodiments 3 or 4, wherein the shielding strip is at or above a perimeter of the PCB.

Embodiment 6

The antenna module of any of embodiments 1-5, wherein the upper edge of the shielding strip is configured to be flush with a housing of a UE.

Embodiment 7

The antenna module of any of embodiments 1-6, wherein a height of the shielding strip from the first surface of the substrate is based at least in part on a predetermined PDE threshold, or a field of view for the plurality of antenna elements, or a field of view for a sensor, or a combination thereof.

Embodiment 8

The antenna module of any of embodiments 1-7, wherein the shielding strip is electrically coupled to a ground plane of the antenna module.

Embodiment 9

The antenna module of any of embodiments 1-7, wherein the shielding strip is electrically isolated from a ground plane of the antenna module.

Embodiment 10

The antenna module of any of embodiments 1-9, further comprising: one or more electrical components mounted on a second surface of the substrate opposite the first surface of the substrate.

Embodiment 11

The antenna module of any of embodiments 1-10, wherein the plurality of antenna elements comprises at least a plurality of patch antennas, or a plurality of slot antennas, or a plurality of dipole antennas, or a combination thereof forming an antenna array.

Embodiment 12

A UE, comprising: a housing having an exterior surface; an antenna module mounted within the housing, wherein the antenna module comprises a plurality of antenna elements on a first surface of a substrate; and a shielding strip enclosing the plurality of antenna elements and extending away from the first surface of the substrate, wherein an upper edge of the shielding strip is above the plurality of antenna elements.

Embodiment 13

The UE of embodiment 12, wherein the first surface of the substrate is recessed from the exterior surface of the housing from a radiating direction of the antenna module.

Embodiment 14

The UE either of embodiment 12 or 13, wherein a lower edge of the shielding strip is at or above the first surface of the substrate.

Embodiment 15

The UE of any of embodiments 12-14, wherein the antenna module comprises the shielding strip, or the housing comprises the shielding strip, or the housing comprises a part of the shielding strip.

Embodiment 16

The UE of any of embodiments 12-15, wherein the exterior surface of the housing comprises a screen oriented on a first side of the antenna module and a back surface oriented on a second side of the antenna module opposite the screen, the back surface comprising a first conductive surface.

Embodiment 17

The UE of embodiment 16, further comprising: a second conductive surface oriented on the first side of the antenna module opposite the back surface, wherein the screen comprises the second conductive surface or the second conductive surface is mounted to a back of the screen.

Embodiment 18

The UE of any of embodiments 12-17, wherein a height of the shielding strip from the first surface of the substrate is based at least in part on a predetermined PDE threshold, or a field of view for the plurality of antenna elements, or a combination thereof.

Embodiment 19

The UE of any of embodiments 12-18, further comprising: a sensor to measure PDE, wherein a height of the shielding strip from the first surface of the substrate is based at least in part on a field of view for the sensor.

Embodiment 20

The UE of any of embodiments 12-19, wherein the shielding strip is electrically coupled to a ground plane of the antenna module.

Embodiment 21

The UE of any of embodiments 12-19, wherein the shielding strip is electrically isolated from a ground plane of the antenna module.

Embodiment 22

The UE of any of embodiments 12-21, wherein the plurality of antenna elements comprises a plurality of patch antennas forming an antenna array.

Embodiment 23

The UE of any of embodiments 12-22, wherein the upper edge of the shielding strip is at or below the exterior surface of the housing in a radiating direction of the antenna module.

Embodiment 24

A method for wireless communications at a UE, comprising: determining a transmit power for a communication beam of the UE based at least in part on a PDE threshold for the communication beam and a shielding strip enclosing a plurality of antenna elements; and transmitting using the communication beam and according to the determined transmit power, an uplink signal using an antenna module.

Embodiment 25

The method of embodiment 24, further comprising: identifying a maximum transmit power for the communication beam based at least in part on the PDE threshold for the communication beam and the shielding strip enclosing the plurality of antenna elements, wherein the transmit power is determined based at least in part on the identified maximum transmit power.

Embodiment 26

The method of either of embodiments 24 or 25, further comprising: identifying one or more candidate communication beams of the UE; determining a respective PDE characteristic for each of the one or more candidate communication beams; and selecting the communication beam from the one or more candidate communication beams, wherein the communication beam comprises a first PDE characteristic, determining the transmit power for the communication beam is based at least in part on the first PDE characteristic, and selecting the communication beam is based at least in part on at least an uplink grant for the UE, or a power level of the UE, or a projected PDE of the communication beam, or the first PDE characteristic, or a combination thereof.

Embodiment 27

The method of any of embodiments 24-26, wherein the UE comprises a detector, the method further comprising: detecting a level of PDE of the communication beam, wherein selecting the communication beam is based at least in part on the detected level of PDE.

Embodiment 28

The method of any of embodiments 24-27, wherein the antenna module comprises the shielding strip.

Embodiment 29

The method of any of embodiments 24-28, wherein the UE comprises a second antenna module comprising a second substrate having a second surface and a second plurality of antenna elements on the second surface and a second shielding strip enclosing the second plurality of antenna elements and extending away from the second surface, the method further comprising: determining a second transmit power for a second communication beam of the UE based at least in part on a second PDE threshold for the second communication beam and the second shielding strip enclosing the second plurality of antenna elements; and transmitting a second uplink signal using the second antenna module and the second communication beam based at least in part on the determined second transmit power.

Embodiment 30

An apparatus for wireless communications at a UE, comprising: the antenna module of any of embodiments 24-29 comprising the substrate having the first surface and the plurality of antenna elements on the first surface; the shielding strip of any of embodiments 24-29 enclosing the plurality of antenna elements and extending away from the first surface; a processor; memory coupled with the processor; and instructions stored in the memory and operable, when executed by the processor, to cause the apparatus to perform a method of any of embodiments 24-29.

Embodiment 31

An apparatus comprising at least one means for performing a method of any of embodiments 24-29.

Embodiment 32

A non-transitory computer-readable medium storing code for wireless communications, the code comprising instructions executable by a processor to perform a method of any of embodiments 24-29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An antenna module, comprising:
    a substrate having a first surface;
    a plurality of antenna elements on the first surface; and
    a shielding strip enclosing the plurality of antenna elements and extending away from the first surface of the substrate, wherein an upper edge of the shielding strip is above the plurality of antenna elements.

2. The antenna module of claim 1, wherein a lower edge of the shielding strip is at or above the first surface of the substrate.

3. The antenna module of claim 1, wherein the substrate comprises a printed circuit board (PCB), the plurality of antenna elements are on the PCB, and the shielding strip is external to the PCB.

4. The antenna module of claim 3, wherein the PCB further comprises:
    a plating member enclosing each antenna element of the plurality of antenna elements, wherein the plating member is on the PCB.

5. The antenna module of claim 3, wherein the shielding strip is at or above a perimeter of the PCB.

6. The antenna module of claim 1, wherein the upper edge of the shielding strip is configured to be flush with a housing of a user equipment (UE).

7. The antenna module of claim 1, wherein a height of the shielding strip from the first surface of the substrate is based at least in part on a predetermined power density exposure threshold, or a field of view for the plurality of antenna elements, or a field of view for a sensor, or a combination thereof.

8. The antenna module of claim 1, wherein the shielding strip is electrically coupled to a ground plane of the antenna module.

9. The antenna module of claim 1, wherein the shielding strip is electrically isolated from a ground plane of the antenna module.

10. The antenna module of claim 1, further comprising:
    one or more electrical components mounted on a second surface of the substrate opposite the first surface of the substrate.

11. The antenna module of claim 1, wherein the plurality of antenna elements comprises at least a plurality of patch antennas, or a plurality of slot antennas, or a plurality of dipole antennas, or a combination thereof forming an antenna array.

12. A user equipment (UE), comprising:
    a housing having an exterior surface;
    an antenna module mounted within the housing, wherein the antenna module comprises a plurality of antenna elements on a first surface of a substrate; and
    a shielding strip enclosing the plurality of antenna elements and extending away from the first surface of the substrate, wherein an upper edge of the shielding strip is above the plurality of antenna elements.

13. The UE of claim 12, wherein the first surface of the substrate is recessed from the exterior surface of the housing from a radiating direction of the antenna module.

14. The UE of claim 12, wherein a lower edge of the shielding strip is at or above the first surface of the substrate.

15. The UE of claim 12, wherein the antenna module comprises the shielding strip, or the housing comprises the shielding strip, or the housing comprises a part of the shielding strip.

16. The UE of claim 12, wherein the exterior surface of the housing comprises a screen oriented on a first side of the antenna module and a back surface oriented on a second side of the antenna module opposite the screen, the back surface comprising a first conductive surface.

17. The UE of claim 16, further comprising:
a second conductive surface oriented on the first side of the antenna module opposite the back surface, wherein the screen comprises the second conductive surface or the second conductive surface is mounted to a back of the screen.

18. The UE of claim 12, wherein a height of the shielding strip from the first surface of the substrate is based at least in part on a predetermined power density exposure threshold, or a field of view for the plurality of antenna elements, or a combination thereof.

19. The UE of claim 12, further comprising:
a sensor to measure power density exposure, wherein a height of the shielding strip from the first surface of the substrate is based at least in part on a field of view for the sensor.

20. The UE of claim 12, wherein the shielding strip is electrically coupled to a ground plane of the antenna module.

21. The UE of claim 12, wherein the shielding strip is electrically isolated from a ground plane of the antenna module.

22. The UE of claim 12, wherein the plurality of antenna elements comprises a plurality of patch antennas forming an antenna array.

23. The UE of claim 12, wherein the upper edge of the shielding strip is at or below the exterior surface of the housing in a radiating direction of the antenna module.

24. An apparatus for wireless communications at a user equipment (UE), comprising:
an antenna module comprising a substrate having a first surface and a plurality of antenna elements on the first surface;
a shielding strip enclosing the plurality of antenna elements and extending away from the first surface;
a processor;
memory coupled with the processor; and
instructions stored in the memory and operable, when executed by the processor, to cause the apparatus to:
determine a transmit power for a communication beam of the UE based at least in part on a power density exposure threshold for the communication beam and the shielding strip enclosing the plurality of antenna elements; and
transmit, using the communication beam and according to the determined transmit power, an uplink signal using the antenna module.

25. The apparatus of claim 24, wherein the instructions are further executable by the processor to cause the apparatus to:
identify a maximum transmit power for the communication beam based at least in part on the power density exposure threshold for the communication beam and the shielding strip enclosing the plurality of antenna elements, wherein the transmit power is determined based at least in part on the identified maximum transmit power.

26. The apparatus of claim 24, wherein the instructions are further executable by the processor to cause the apparatus to:
identify one or more candidate communication beams of the UE;
determine a respective power density exposure characteristic for each of the one or more candidate communication beams; and
select the communication beam from the one or more candidate communication beams, wherein the communication beam comprises a first power density exposure characteristic, determining the transmit power for the communication beam is based at least in part on the first power density exposure characteristic, and selecting the communication beam is based at least in part on at least an uplink grant for the UE, or a power level of the UE, or a projected power density exposure of the communication beam, or the first power density exposure characteristic, or a combination thereof.

27. The apparatus of claim 24, further comprising:
a detector, wherein the instructions are further executable by the processor to cause the apparatus to:
detect a level of power density exposure of the communication beam, wherein selecting the communication beam is based at least in part on the detected level of power density exposure.

28. The apparatus of claim 24, wherein the antenna module comprises the shielding strip.

29. The apparatus of claim 24, further comprising:
a second antenna module comprising a second substrate having a second surface and a second plurality of antenna elements on the second surface; and
a second shielding strip enclosing the second plurality of antenna elements and extending away from the second surface, wherein the instructions are further executable by the processor to cause the apparatus to:
determine a second transmit power for a second communication beam of the UE based at least in part on a second power density exposure threshold for the second communication beam and the second shielding strip enclosing the second plurality of antenna elements; and
transmit a second uplink signal using the second antenna module and the second communication beam based at least in part on the determined second transmit power.

30. A method for wireless communications at a user equipment (UE), comprising:
determining a transmit power for a communication beam of the UE based at least in part on a power density exposure threshold for the communication beam and a shielding strip enclosing a plurality of antenna elements on a first surface of an antenna module of the UE, the shielding strip enclosing the plurality of antenna elements above the first surface; and
transmitting, using the communication beam and according to the determined transmit power, an uplink signal using the antenna module.

* * * * *